(12) United States Patent
Breed et al.

(10) Patent No.: US 8,994,546 B2
(45) Date of Patent: Mar. 31, 2015

(54) REMOTE MONITORING OF MATERIAL STORAGE CONTAINERS

(75) Inventors: David S. Breed, Miami Beach, FL (US); Wilbur E. DuVall, Branson West, MO (US); Wendell C. Johnson, Wilmington, CA (US)

(73) Assignee: Intelligent Technologies International, Inc., Miami Beach, FL (US)

( * ) Notice: Subject to any disclaimer, the term of this patent is extended or adjusted under 35 U.S.C. 154(b) by 146 days.

(21) Appl. No.: 13/592,455

(22) Filed: Aug. 23, 2012

(65) Prior Publication Data

US 2013/0002443 A1 Jan. 3, 2013

Related U.S. Application Data

(63) Continuation-in-part of application No. 11/619,863, filed on Jan. 4, 2007, which is a continuation-in-part of application No. 10/931,288, filed on Aug. 31, 2004, now Pat. No. 7,164,117, which is a (Continued)

(51) Int. Cl.
*G08B 21/00* (2006.01)
*G01J 5/08* (2006.01)
*B65D 90/48* (2006.01)

(52) U.S. Cl.
CPC .............. *G01J 5/0846* (2013.01); *B65D 90/48* (2013.01); *B65D 2590/0083* (2013.01)
USPC .............. 340/686.1; 340/539.14; 340/426.19; 340/539.1; 340/540; 342/457; 342/42; 342/44; 342/46

(58) Field of Classification Search
CPC ............ G01F 23/2962; G01F 23/0076; G01F 23/284; G01N 2291/02836; B01D 17/0205; B60R 2021/01537; B60R 21/015; G08B 13/2462; G08B 13/248; G08B 21/0286
USPC ................. 340/870.14, 573.3, 686.1, 539.22, 340/539.1, 568.1, 539.14, 426.19, 540; 73/290 V, 290 R, 618, 627, 620, 646; 705/22; 342/457, 42, 44, 46
See application file for complete search history.

(56) References Cited

U.S. PATENT DOCUMENTS

| | | | |
|---|---|---|---|
| 3,772,667 A | 11/1973 | Falck, Jr. | |
| 3,894,431 A * | 7/1975 | Muston et al. | 73/861.29 |

(Continued)

FOREIGN PATENT DOCUMENTS

| | | |
|---|---|---|
| EP | 0710820 A1 | 5/1996 |
| EP | 1215471 A1 | 6/2002 |

OTHER PUBLICATIONS nvoy—LT4; A remote liquid level Monitoring system for up to four (4) tanks, website of Envoy Technologies, posted on Jan. 17, 2013.

(Continued)

*Primary Examiner* — Hoi Lau

(57) ABSTRACT

Arrangement and method for monitoring a material storage container which includes a housing defining an interior receivable of removable material. An interior sensor system is arranged on the housing to obtain information about any material in the interior of the housing different than the location of the container. A location determining system is arranged on the housing to monitor the location of the container, and a communication system is coupled to the interior sensor system and the location determining system and transmits information about the material in the housing and the location of the container to one or more remote facilities. The communication system may be arranged on the housing itself, which is especially applicable when the housing is movable, for example, such as the housing of a Frac tank. The location and condition of the material in the container can thus be known at all times.

23 Claims, 8 Drawing Sheets

Related U.S. Application Data continuation-in-part of application No. 11/843,932, filed on Aug. 23, 2007, now Pat. No. 8,310,363, and a continuation-in-part of application No. 11/935,819, filed on Nov. 6, 2007, now abandoned, which is a continuation-in-part of application No. 10/940,881, filed on Sep. 13, 2004, now Pat. No. 7,663,502, which is a continuation-in-part of application No. 10/457,238, filed on Jun. 9, 2003, now Pat. No. 6,919,803, said application No. 10/940,881 is a continuation-in-part of application No. 10/931,288, filed on Aug. 31, 2004, now Pat. No. 7,164,117, said application No. 11/935,819 is a continuation-in-part of application No. 11/278,979, filed on Apr. 7, 2006, now Pat. No. 7,386,372, and a continuation-in-part of application No. 11/380,574, filed on Apr. 27, 2006, now Pat. No. 8,159,338, which is a continuation-in-part of application No. 10/931,288, filed on Aug. 31, 2004, now Pat. No. 7,164,117, said application No. 11/935,819 is a continuation-in-part of application No. 11/755,199, filed on May 30, 2007, now Pat. No. 7,911,324, and a continuation-in-part of application No. 11/865,363, filed on Oct. 1, 2007, now Pat. No. 7,819,003.

(60) Provisional application No. 60/387,792, filed on Jun. 11, 2002.

(56) References Cited

U.S. PATENT DOCUMENTS

| | | | | |
|---|---|---|---|---|
| 4,053,714 A * | | 10/1977 | Long | 340/870.14 |
| 4,147,893 A | | 4/1979 | Matson | |
| 4,279,157 A * | | 7/1981 | Schomberg et al. | 73/618 |
| 4,299,128 A * | | 11/1981 | Gruber | 73/627 |
| RE31,089 E | | 11/1982 | Adamson | |
| 4,413,250 A | | 11/1983 | Porter et al. | |
| 4,487,065 A | | 12/1984 | Carlin et al. | |
| 4,596,144 A * | | 6/1986 | Panton et al. | 73/620 |
| 4,598,742 A | | 7/1986 | Taylor | |
| 4,602,344 A | | 7/1986 | Ferretti et al. | |
| 4,782,451 A | | 11/1988 | Mazzarella et al. | |
| 4,901,575 A | | 2/1990 | Bohannan et al. | |
| 5,085,077 A | | 2/1992 | Stapleton et al. | |
| 5,138,559 A * | | 8/1992 | Kuehl et al. | 702/55 |
| 5,184,510 A * | | 2/1993 | Rossman | 73/290 V |
| 5,202,667 A | | 4/1993 | Alvin | |
| 5,206,642 A | | 4/1993 | Gregoire et al. | |
| 5,263,371 A * | | 11/1993 | Maresca et al. | 73/290 V |
| 5,266,953 A * | | 11/1993 | Kelly et al. | 342/47 |
| 5,305,237 A | | 4/1994 | Dalrymple et al. | |
| 5,305,390 A | | 4/1994 | Frey et al. | |
| 5,311,197 A | | 5/1994 | Sorden et al. | |
| 5,334,974 A | | 8/1994 | Simms et al. | |
| 5,543,720 A * | | 8/1996 | Edvardsson | 324/643 |
| 5,569,265 A * | | 10/1996 | Elliott | 606/123 |
| 5,594,449 A * | | 1/1997 | Otto | 342/124 |
| 5,619,560 A | | 4/1997 | Shea | |
| 5,673,305 A | | 9/1997 | Ross | |
| 5,760,309 A * | | 6/1998 | Maltby et al. | 73/646 |
| 5,774,876 A | | 6/1998 | Woolley et al. | |
| 5,793,705 A * | | 8/1998 | Gazis et al. | 367/98 |
| 5,804,810 A | | 9/1998 | Woolley et al. | |
| 5,892,441 A | | 4/1999 | Woolley et al. | |
| 5,959,529 A | | 9/1999 | Kail, IV | |
| 5,959,568 A | | 9/1999 | Woolley | |
| 5,983,198 A * | | 11/1999 | Mowery et al. | 705/22 |
| 5,987,994 A * | | 11/1999 | Maltby et al. | 73/646 |
| 6,078,850 A * | | 6/2000 | Kane et al. | 701/31.4 |
| 6,147,598 A | | 11/2000 | Murphy et al. | |
| 6,166,627 A | | 12/2000 | Reeley | |
| 6,229,448 B1 | | 5/2001 | Bennett, Jr. et al. | |
| 6,236,911 B1 | | 5/2001 | Kruger | |
| 6,253,610 B1 | | 7/2001 | Struzik et al. | |
| 6,255,942 B1 | | 7/2001 | Knudsen | |
| 6,281,797 B1 * | | 8/2001 | Forster et al. | 340/572.3 |
| 6,295,018 B1 * | | 9/2001 | Diede et al. | 342/124 |
| 6,331,825 B1 | | 12/2001 | Ladner et al. | |
| 6,336,362 B1 * | | 1/2002 | Duenas | 73/313 |
| 6,356,205 B1 | | 3/2002 | Salvo et al. | |
| 6,374,187 B1 | | 4/2002 | Knight et al. | |
| 6,397,656 B1 * | | 6/2002 | Yamaguchi et al. | 73/1.82 |
| 6,407,479 B1 * | | 6/2002 | Moellendorf et al. | 310/313 A |
| 6,419,349 B1 * | | 7/2002 | Iwanaga et al. | 347/86 |
| 6,429,773 B1 | | 8/2002 | Schuyler | |
| 6,444,119 B1 * | | 9/2002 | Mains, Jr. | 210/85 |
| 6,484,088 B1 | | 11/2002 | Reimer | |
| 6,492,904 B2 | | 12/2002 | Richards | |
| 6,510,367 B1 * | | 1/2003 | McQuinn | 700/241 |
| 6,512,455 B2 | | 1/2003 | Finn et al. | |
| 6,563,433 B2 * | | 5/2003 | Fujiwara | 340/988 |
| 6,615,656 B1 * | | 9/2003 | Breed et al. | 73/290 R |
| 6,615,657 B2 * | | 9/2003 | Hongerholt et al. | 73/290 V |
| 6,617,963 B1 | | 9/2003 | Watters et al. | |
| 6,662,649 B1 | | 12/2003 | Knight | |
| 6,680,944 B1 * | | 1/2004 | Lym et al. | 370/394 |
| 6,687,609 B2 | | 2/2004 | Hsiao et al. | |
| 6,690,182 B2 | | 2/2004 | Kelly et al. | |
| 6,691,025 B2 | | 2/2004 | Reimer | |
| 6,700,503 B2 * | | 3/2004 | Masar et al. | 340/870.01 |
| 6,711,949 B1 | | 3/2004 | Sorenson | 73/313 |
| 6,782,122 B1 * | | 8/2004 | Kline et al. | 382/142 |
| 6,794,991 B2 | | 9/2004 | Dungan | |
| 6,816,072 B2 | | 11/2004 | Zoratti | |
| 6,856,257 B1 | | 2/2005 | Van Heteren | |
| 6,892,572 B2 * | | 5/2005 | Breed et al. | 73/290 R |
| 6,895,305 B2 | | 5/2005 | Lathan et al. | |
| 6,900,732 B2 | | 5/2005 | Richards | |
| 6,919,803 B2 * | | 7/2005 | Breed | 340/539.14 |
| 7,006,009 B2 * | | 2/2006 | Newman | 340/854.5 |
| 7,103,511 B2 | | 9/2006 | Petite | |
| 7,131,136 B2 | | 10/2006 | Monroe | |
| 7,174,783 B2 * | | 2/2007 | McSheffrey et al. | 73/291 |
| 7,263,073 B2 | | 8/2007 | Petite et al. | |
| 7,561,040 B2 | | 7/2009 | Reid et al. | |
| 7,602,671 B2 | | 10/2009 | Dionysion | |
| 8,223,027 B2 | | 7/2012 | Jenkins et al. | |
| 8,234,084 B2 | | 7/2012 | Wicht et al. | |
| 2002/0077750 A1 * | | 6/2002 | McDonald et al. | 701/213 |
| 2003/0069684 A1 * | | 4/2003 | Reimer | 701/123 |
| 2004/0113790 A1 | | 6/2004 | Hamel et al. | |
| 2007/0188374 A1 * | | 8/2007 | Fehrenbach et al. | 342/124 |
| 2008/0061959 A1 | | 3/2008 | Breed | |

OTHER PUBLICATIONS

Tank Gauging Products for Bulk Liquid Storage Tanks, Varec, Inc., copyright 2012.

* cited by examiner

US 8,994,546 B2

REMOTE MONITORING OF MATERIAL STORAGE CONTAINERS

CROSS REFERENCE TO RELATED APPLICATIONS

This application is:
A) a continuation-in-part (CIP) of U.S. patent application Ser. No. 11/619,863 filed Jan. 4, 2007 which is a CIP of U.S. patent application Ser. No. 10/931,288 filed Aug. 31, 2004, now U.S. Pat. No. 7,164,117;
B) a CIP of U.S. patent application Ser. No. 11/843,932 filed Aug. 23, 2007 now U.S. Pat. No. 8,310,363; and
C) a CIP of U.S. patent application Ser. No. 11/935,819 filed Nov. 6, 2007 now abandoned, which is a:
 1. a CIP of U.S. patent application Ser. No. 10/940,881 filed Sep. 13, 2004, now U.S. Pat. No. 7,663,502, which is:
  a. a CIP of U.S. patent application Ser. No. 10/457,238 filed Jun. 9, 2003, now U.S. Pat. No. 6,919,803 which claims priority under 35 U.S.C. §119(e) of U.S. provisional patent application Ser. No. 60/387,792 filed Jun. 11, 2002, now expired; and
  b. a CIP of U.S. patent application Ser. No. 10/931,288 filed Aug. 31, 2004, now U.S. Pat. No. 7,164,117;
 2. a CIP of U.S. patent application Ser. No. 11/278,979 filed Apr. 7, 2006, now U.S. Pat. No. 7,386,372;
 3. a CIP of U.S. patent application Ser. No. 11/380,574 filed Apr. 27, 2006, now U.S. Pat. No. 8,159,338, which is a CIP of U.S. patent application Ser. No. 10/931,288 filed Aug. 31, 2004, now U.S. Pat. No. 7,164,117;
 4. a CIP of U.S. patent application Ser. No. 11/755,199 filed May 30, 2007, now U.S. Pat. No. 7,911,324; and
 5. a CIP of U.S. patent application Ser. No. 11/865,363 filed Oct. 1, 2007, now U.S. Pat. No. 7,819,003.

This application is related to U.S. patent application Ser. No. 11/416,475 filed May 1, 2006 on the grounds that they include common subject matter.

All of the above-referenced applications are incorporated by reference herein.

FIELD OF THE INVENTION

The present invention relates to arrangements and methods for monitoring interior spaces of structures which hold bulk material such as liquids or other flowable materials, and more particularly to obtaining information about materials in interior spaces of such structures. Even more specifically, the present invention relates to arrangements and methods for obtaining information about flowable materials, such as liquids, agricultural commodities and sheets of paper, in storage containers or other structures and for transmitting that obtained information to one or more remote sites using the cellphone or internet infrastructure.

BACKGROUND OF THE INVENTION

A detailed discussion of background information is set forth in parent applications listed above and incorporated by reference herein. All of the patents, patent applications, technical papers and other references referenced below and in the parent applications are incorporated herein by reference in their entirety. Various patents, patent applications, patent publications and other published documents are discussed below as background of the invention. No admission is made that any or all of these references are prior art and indeed, it is contemplated that they may not be available as prior art when interpreting 35 U.S.C. §102 in consideration of the claims of the present application.

SUMMARY OF THE INVENTION

A material storage container including an arrangement for monitoring the container in accordance with the invention includes a housing defining an interior receivable of a removable material, an interior sensor system arranged on the housing to obtain information about any material in the interior of the housing different than the location of the container, a location or identification determining system arranged on the container to monitor the location or identification of the container, and a communication system coupled to the interior sensor system and the location determining system and which is arranged to transmit the obtained information about the material in the interior of the housing and the location of the container to one or more remote facilities or sites using the cellular phone system and/or Internet where it is further processed into a report which can be periodically, and/or upon demand, sent to one or more customers detailing which containers need servicing. The communication system may be arranged on the housing itself, which is especially applicable when the housing is movable, for example, such as the housing of a Frac tank or other storage container.

Numerous variations of the interior sensor system are envisioned. In one embodiment, the interior sensor system includes at least one wave transmitter/receiver arranged to direct waves at an upper surface of the material when present in the interior of the housing and a processor arranged to analyze waves received by each wave transmitter/receiver and obtain information about the material in the interior of the housing based on analysis of the received waves. The processor may be programmed to compensate for thermal and/or gas density gradients in the interior of the housing. To facilitate such measurement of the quantity or level of material, at least one reference target may be arranged in the interior of the housing each at a known distance from a respective ultrasonic transmitter/receiver and in a field of transmission thereof. In operation, each transmitter/receiver receives waves reflected from the upper surface of the material and from the associated reference target. The processor analyzes the waves and determines the level of material in the interior of the housing, knowing the distance between each transmitter/receiver and its associated reference target. In another embodiment, the processor compares waves received by each wave transmitter/receiver at different times and obtains information about the material in the interior of the housing based on the comparison of the received waves, possibly in combination with other known factors such as the quantity of material at a known level.

In particular for movable containers, one or more tilt or inclination sensors can be arranged on the housing to determine an inclination of the housing. The processor is coupled to each tilt sensor and considers the determined inclination of the housing when obtaining information about the material in the interior of the housing, e.g., when determining the level or quantity of material in the container.

The interior sensor system can include at least one chemical sensor for monitoring the chemical nature of the material in the interior of the housing such that the obtained information about the material includes information about the chemical nature of the material or chemicals emitted by the material. Also, an exterior monitoring system can be provided for monitoring an environment around the housing, e.g., the ambient atmosphere, to obtain information about the environment around the housing. The communication system is coupled to the exterior monitoring and transmits the information about the environment around the housing to the remote facility or facilities.

The interior sensor system may include an initiation device for periodically initiating the interior sensor system to obtain information about the material in the interior of the housing. A wakeup sensor system may detect occurrence of an internal or external event, or the absence of an event for a time period, requiring a change in the frequency of monitoring of the interior of the housing. Such an event might be the opening or closing of a lid or cover or a valve which regulates input of material into the container or output of material from the container. The initiation device is coupled to the wakeup sensor system and changes the rate at which it initiates the interior sensor system to obtain information about the material in the interior of the housing in response to the detected occurrence of an internal or external event by the wakeup sensor system.

A motion or vibration detection system may be arranged on the housing to detect motion or vibration of the container or a part thereof. The interior sensor system is coupled to the motion or vibration detection system and obtains information about the material in the interior of the housing only after the container or a part thereof is determined to have moved from a stationary position or vibrated. This conserves power for the components.

A method for monitoring material in a material storage container in accordance with the invention includes arranging an interior sensor system on a housing of the container to obtain information about any material in the interior of the housing different than the location of the container, monitoring the location of the container via a location determining system at least partially arranged on the container, and periodically transmitting the obtained information about the material in the interior of the housing and the location or ID of the container to a remote facility. The periodic transmission may be at set intervals, upon occurrence of predetermined events, upon request by the remote facility, or at other intervals set by whatever conditions are desired by the container or container owner, operator or maintainer.

The interior sensor system may be as in any of the embodiments described herein and can provide an indication of the presence of material in a container and the level of material in the container. To improve the determination of the level or quantity of material in the container, an inclination of the housing may be determined via at least one tilt sensor arranged on the housing, and a quantity of material in the container determined based in part on the determined inclination of the housing.

The chemical nature of the material in the interior of the housing may be monitored, e.g., via one or more optical or chemical sensors, such that the chemical nature of the material is part of the information about the material being periodically transmitted to the remote facility.

An environment around the housing or the ambient atmosphere may be monitored, e.g., via one or more optical, chemical, temperature, pressure, etc. sensors, to obtain information about the environment around the housing. The information about the environment around the housing can be transmitted to the remote facility along with the information about the material in the interior of the housing and the location or ID of the container.

To effect communications from the communications unit which creates the periodic transmissions, occurrence of an internal or external event, or the absence of an event for a time period, requiring a change in the frequency of monitoring of the interior of the housing may be detected and the rate at which the interior sensor system obtains information about the material in the interior of the housing can be adjusted or changed in response to the detected occurrence of an internal or external event. The communications unit can communicate through a cell phone network or directly to an Internet ISP. The rate at which the interior sensor system obtains information about the material in the interior of the housing may mean the time interval between consecutive information obtaining steps. That is, instead of obtaining information every hour on the hour in one state, when an internal or external event is detected, the rate at which information is obtained is changed to every fifteen minutes.

When the container is a movable container, motion or vibration of the container or a part thereof may be detected and information about the material in the interior of the housing obtained only after motion or vibration of the container or part thereof is detected.

In one embodiment of the invention, a storage container includes a movable housing or structure defining an interior space for containing or designed to contain one or more flowable materials, and an arrangement mounted on, joined or coupled to the structure for determining information about the flowable materials including whether flowable material is present in the interior space, or the presence of multiple flowable materials referred to herein in general as materials as defined herein.

Various constructions of such an arrangement have been envisioned and one arrangement includes at least one optical imaging device configured to receive images of the interior space defined by the structure, and a processor coupled to the optical imaging device(s) and configured to determine whether one or more materials are present in the interior space and when one or more materials are determined to be present, to obtain information about the material or materials. The processor is preferably configured to distinguish between different levels, volumes or quantities of materials.

In one embodiment, the processor generates a signal characteristic of the material based on the received images or waves, and categorizes the signal to thereby identify the level, volume or quantity of the material. Hereinafter, the term "level" will be used to mean either the mass, level, volume or quantity of the material. The waves may be either ultrasonic or electromagnetic. To this end, the processor might apply a pattern recognition technique to recognize and thus identify a class, quantity or level of the material by processing the signal into a categorization of the signal based on data relating to images or waves received by the optical imaging or wave receiving device(s) stored within or available to the pattern recognition technique and associated with possible classes and levels of materials. The processor can thus apply a pattern recognition algorithm generated from images of the interior space or waves received with different materials and levels therein, and the absence of any materials, in order to obtain information about the material(s).

Only a single optical imaging or wave receiving device can be provided or a plurality of optical imaging or wave receiving devices can be provided, possibly spaced apart from one another in a position in which each will have a different field of view of the interior of the housing or structure. Optical imaging or wave receiving devices may be mounted throughout the structure including on or proximate to a roof, lid or cover of the structure. Additionally, one or more tilt, inclination or angle measuring devices can be provided to determine the rotations of the structure about one or more of the horizontal axes.

A neural network can be embodied in the processor to determine whether a material is present after being trained in a training stage in which images or waves received by the optical imaging device(s) or wave receiver(s) in the absence of materials in the interior space and images or waves received by the optical imaging device(s) or wave receiver(s) with materials present in the interior space are collected and used to derive the neural network. Any known neural network derivation process can be similarly applied.

An illumination device or a plurality of such devices may be mounted on the structure for illuminating at least a portion of the interior space with ultrasonic or electromagnetic radiation, preferably that portion from which images are to be obtained. A structured light generator or a plurality of such generators may be provided to transmit structured light into the interior space. Structured light aids in the determination of information about the objects.

Information about the object(s) or material level may be used for numerous purposes including, but not limited to, controlling one or more reactive systems coupled to the processor and controlled thereby based on the determination as to whether material is present in the interior space and the information about the material quantity or level when present in the interior space. The information about the object or material level determined by the processor when material is present in the interior space may be a level of material. The reactive system can be a vehicle communication system.

BRIEF DESCRIPTION OF THE DRAWINGS

The following drawings are illustrative of embodiments of the system developed or adapted using the teachings of at least one of the inventions disclosed herein and are not meant to limit the scope of the invention as encompassed by the claims. In particular, the illustrations below are frequently limited to the monitoring of a liquid container for the purpose of describing the system. The invention applies as well to adapting the system to the other material containers.

DETAILED DESCRIPTION OF THE INVENTION

Whenever a patent or literature is referred to below, it is to be assumed that all of that patent or literature is to be incorporated by reference in its entirety to the extent the disclosure of this reference is necessary. Also note that although many of the examples below relate to a liquid storage container, the invention is not limited to any particular structure or vehicle and is thus applicable to all relevant structures or vehicles including shipping containers, fixed or movable storage containers and truck trailers and to all compartments of a vehicle.

Prior to describing the invention in detail, definitions of certain words or phrases used throughout this patent document will be defined: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. The functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

"Material" is used herein to generally mean any flowable material including a liquid; gas; granular material; garbage; agricultural or construction products, refuse or other materials; or sheets of paper, and which can be transferred from one container to another by dumping or pumping. "Container" as used herein generally means a container capable of holding a material.

Figure 7A:
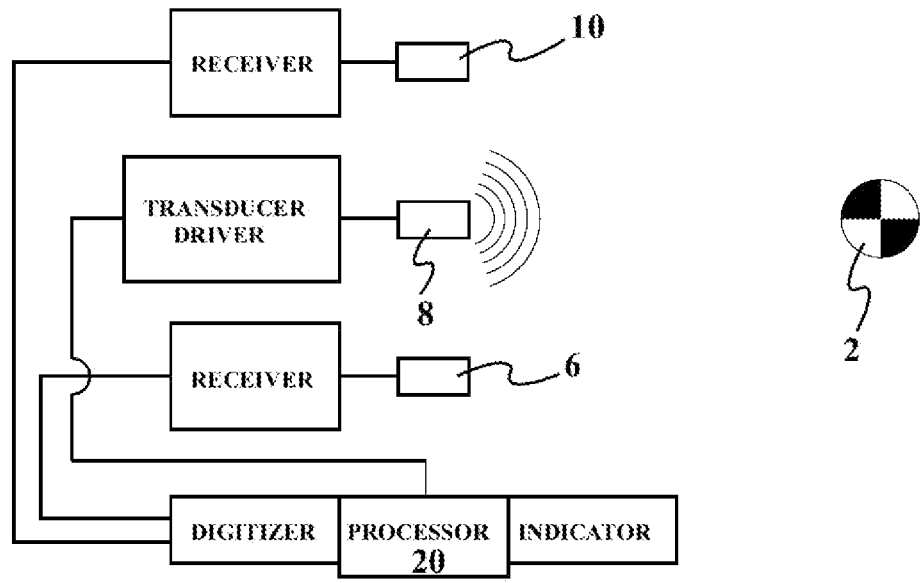
FIG. 7A is a functional block diagram of the ultrasonic imaging system illustrated in FIGS. 1-4 using a microprocessor, DSP or field programmable gate array (FGPA).
Figure 7B:
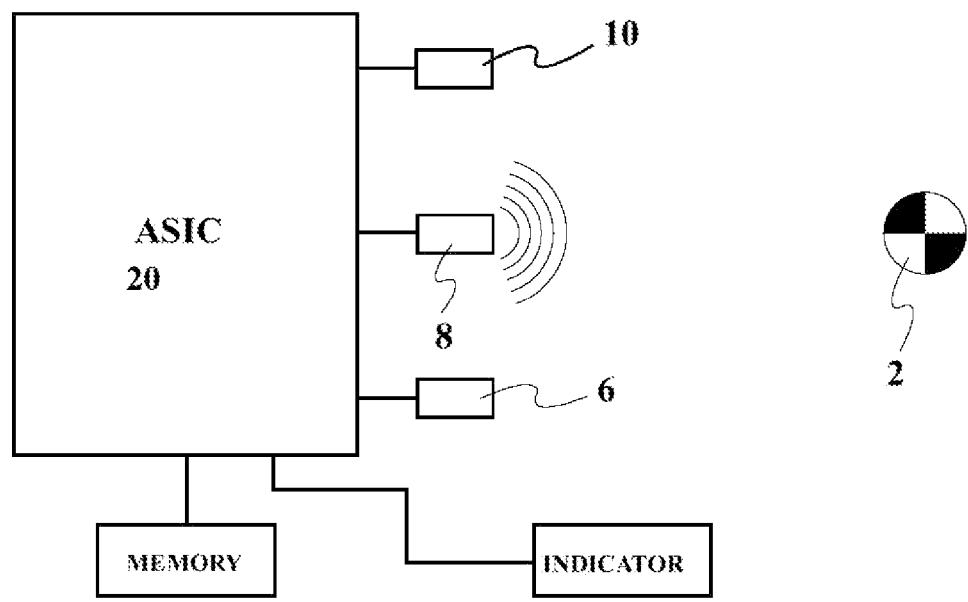
FIG. 7B is a functional block diagram of the ultrasonic imaging system illustrated in FIGS. 1-4 using an application specific integrated circuit (ASIC).

There are at least two preferred methods of implementing the container interior monitoring system of at least one of the inventions disclosed herein, a microprocessor system and an application specific integrated circuit system (ASIC). Both of these systems are represented schematically as 20 herein in the block diagrams of FIGS. 7A and 7B. In some systems, both a microprocessor and an ASIC are used. In other systems, most if not all of the circuitry is combined onto a single chip (system on a chip). The particular implementation depends on, for example, the quantity to be made and economic considerations. In both cases, the target, which may be the top surface of a material, is shown schematically as 2 and two ultrasonic transducers as 6 and 8. In the embodiment of FIG. 7A, there is a digitizer coupled to the receiver 6 and the processor 20, and a communication system coupled to the processor 20. In the embodiment of FIG. 7B, there is a memory unit associated with the ASIC and also a communication system coupled to the ASIC.

The level of the material may be determined by transmitting waves to reflect off the material top surface, receiving the reflected waves, and analyzing the time between transmission and reception of the waves. The waves are herein assumed to be ultrasonic but a similar analysis could take place for radar or other electromagnetic waves. In some cases, the level of the material can also be determined using capacitance methods. In the latter case, a capacitance or capacitive sensor or electric field based sensor could be used.

1. Ultrasonics 1.1 General

Typical ultrasonic frequencies for use in air range from about 40 to 160 kilohertz (kHz). The wavelength of a 50 kHz acoustic wave is about 0.6 cm. Similarly, the wavelength of common radar systems varies from about 0.9 cm (for 33 GHz K band) to 133 cm (for 225 MHz P band). Some of the devices herein illustrated assume that for the ultrasonic system, the same device is used for both transmitting and receiving waves, there are advantages in separating these functions, at least for standard transducer systems. Since there can be a significant time lag required for the system to stabilize after transmitting a pulse before it can receive a pulse, close measurements are enhanced, for example, by using separate transmitters and receivers. This increases the systems cost and power requirements. Recent advances in ultrasonic transducer design have now permitted the use of a single transducer acting as both a sender (transmitter) and receiver. These same advances have substantially reduced the ringing of the transducer after the excitation pulse has been caused to die out to where targets as close as about 2 inches from the transducer can be sensed. Thus, the magnitude of the ringing time period has been substantially reduced. See U.S. Pat. No. 6,731,569.

1.2 Thermal Gradients

Techniques for compensating for thermal gradients which affect ultrasonic waves and electromagnetic waves are set forth in U.S. Pat. No. 7,663,502.

1.3 Gas Density Gradients

In some applications of the ultrasonic, electromagnetic and optical receiving devices, in particular, use of such devices for determining information about a material in an enclosed storage container, there may be gas density gradients caused by temperature variations and/or by variations in the make-up or composition or chemical nature of the gas or liquid in the storage container. For example, in a liquid storage container, a mixture of gasses could separate with the more dense gas near the liquid surface and the less dense gas near the top of the storage container. This gas density gradient may affect ultrasonic waves and therefore, in the embodiment described below wherein an ultrasonic sensor is arranged at the top wall of the storage container, the determination of the distance between the ultrasonic sensor and the upper surface of the liquid enables a compensation by a processor to improve the accuracy of the measurement of the level or quantity of material in the interior of the container. To ensure reasonable accuracy of the determination of the distance between the ultrasonic sensor and the upper surface of the liquid, and thus an accurate assessment of the material level, compensation should be made for any gas density gradient that is present.

One way to achieve this is to determine the gas density at multiple, spaced-apart locations in the container, i.e., in the area in which gas is present in the container which would be the area between the upper surface of the liquid and the top of the container. If the gas density readings from appropriate gas density sensors are all equal, this would be indicative of the lack of a gas density gradient. However, if the gas density readings are different, a processor which determines the distance between the ultrasonic sensor and the upper surface of the liquid (and uses this distance determination to determine the level of material in the storage container) must compensate for the gas density gradient if it affects the ultrasonic waves.

The embodiment wherein the level of liquid in a storage container is determined is thus especially appropriate environment for a technique to compensate for gas density gradients or gaseous stratification.

2. Optics

The optical transmitter/receiver assemblies frequently comprise an optical transmitter, which may be an infrared LED (or a near infrared (NIR) LED), a laser which can have a diverging lens or a scanning laser assembly, and a receiver such as a photodiode, CCD or CMOS array. The transducer assemblies can map the location of the material surface.

Figure 8:
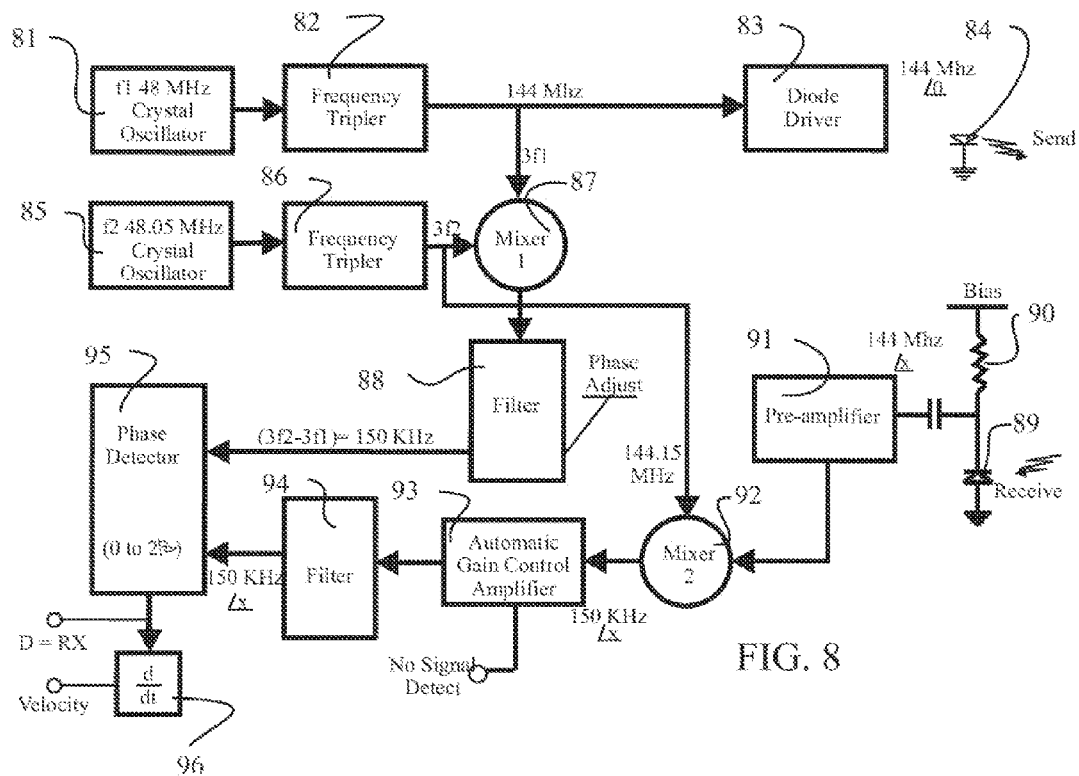
FIG. 8 is a schematic illustrating the circuit of a level sensing device using a modulated infrared signal, beat frequency and phase detector system.

A particular implementation of a container material level sensor having any designed range using infrared is illustrated in the block diagram schematic of FIG. 8. This system can be designed for any reasonable range up to and exceeding 100 meters. The operation is as follows. A 48 MHz signal, f1, is generated by a crystal oscillator 81 and fed into a frequency tripler 82 which produces an output signal at 144 MHz. The 144 MHz signal is then fed into an infrared diode driver 83 which drives the infrared diode 84 causing it to emit infrared light modulated at 144 MHz and a reference phase angle of zero degrees. The infrared diode 84 is directed at the material surface. A second signal f2 having a frequency of 48.05 MHz, which is slightly greater than f1, is similarly fed from a crystal oscillator 85 into a frequency tripler 86 to create a frequency of 144.15 MHz. This signal is then fed into a mixer 87 which combines it with the 144 MHz signal from frequency tripler 82. The combined signal from the mixer 87 is then fed to filter 88 which removes all signals except for the difference, or beat frequency, between 3 times f1 and 3 times f2, of 150 kHz. The infrared signal which is reflected from the material surface is received by receiver 89 and fed into pre-amplifier 91, a resistor 90 to bias being coupled to the connection between the receiver 89 and the pre-amplifier 91. This signal has the same modulation frequency, 144 MHz, as the transmitted signal but now is out of phase with the transmitted signal by an angle x due to the path that the signal took from the transmitter to the material surface and back to the receiver.

The output from pre-amplifier 91 is fed to a second mixer 92 along with the 144.15 MHz signal from the frequency tripler 86. The output from mixer 92 is then amplified by an automatic gain amplifier 93 and fed into filter 94. The filter 94 eliminates all frequencies except for the 150 kHz difference, or beat, frequency, in a similar manner as was done by filter 88. The resulting 150 kHz frequency, however, now has a phase angle x relative to the signal from filter 88. Both 150 kHz signals are now fed into a phase detector 95 which determines the magnitude of the phase angle x. It can be shown mathematically that, with the above values, the distance from the transmitting diode to the material surface is x/345.6 where x is measured in degrees and the distance in meters. The velocity can also be obtained using the distance measurement as represented by 96. An alternate method of obtaining distance information is to use the teachings of the McEwan patents discussed in the patents referenced herein.

Although the embodiment shown in FIG. 8 uses near infrared, it is possible to use other frequencies of energy without deviating from the scope of the invention. In particular, there are advantages in using the short wave (SWIR), medium wave (MWIR) and long wave (LWIR) portions of the infrared spectrum as the interact in different and interesting ways with different materials as described in the book *Alien Vision: Exploring the Electromagnetic Spectrum with Imaging Technology* by Austin Richards.

3. Radar

Particular mention should be made of the use of radar since novel inexpensive ultra wideband radars are now readily available such as micropower impulse radar (MIR).

Another preferred embodiment makes use of radio waves and a voltage-controlled oscillator (VCO). In this embodiment, the frequency of the oscillator is controlled through the use of a phase detector which adjusts the oscillator frequency so that exactly one half wave occupies the distance from the transmitter to the receiver via reflection off of the material surface in the case of a storage container. The adjusted frequency is thus inversely proportional to the distance from the transmitter to the surface. Alternately, an FM phase discriminator can be used as known to those skilled in the art.

4. Frequency or Spectrum Considerations

The maximum acoustic frequency range that is practical to use for acoustic imaging in the acoustic systems herein is about 40 to 160 kilohertz (kHz). The wavelength of a 50 kHz acoustic wave is about 0.6 cm. Similarly, the wavelength of common radar systems varies from about 0.9 cm (for 33 GHz K band) to 133 cm (for 225 MHz P band). Millimeter wave and sub-millimeter wave radar can of course emit and receive considerably smaller waves. Millimeter wave radar and Micropower Impulse Radar (MIR) as discussed above are particularly useful for level determination.

In some cases, a combination of frequencies is most useful. This combination occurs naturally with noise radar (NR), ultra-wideband radar (UWB) and MIR and these technologies are appropriate for level determination.

5. Telematics

Some of the inventions herein relate generally to telematics and the transmission of information from a vehicle, truck trailer, tank or container, generally container, to one or more remote sites which can react to the position or status of the container or contents therein.

5.1 Telematics with Non-Automotive Vehicles

Transmission of data obtained from imagers, or other transducers, to a remote location is an important feature of some of the inventions disclosed herein. This capability can permit an owner of a cargo container, storage container or truck trailer to obtain a picture of the interior of the container at any time via telematics.

Generally monitoring of tanks, containers or trailers can be accomplished through telecommunications primarily with LEO or geostationary satellites or through terrestrial-based communication systems. These systems are commercially available and will not be discussed here. Of particular relevance here is the use of the cellular phone system which is now nearly ubiquitous in the United States and much of the world. A particularly useful method of using the cellular network is through the use if SMS or text messaging. As the installation of Wi-Fi, Wimax, Superwifi or other wireless broadband systems becomes more widespread then direct to Internet ISP transmissions can become the method of choice for machine to machine communication such as the systems described herein.

5.2 Telematics for Storage Containers

What follows in a discussion of remote monitoring the level of a material in a storage container or container as well as other properties of a container, its environment and its contents. The determination of the level of a material in a container has been the subject of many patents, books and other published articles and papers (see, for example, Measurement and Control of Liquid Level (An Independent learning module from the Instrument Society of America) by Chun H. Cho, which describes several such methods). A combination of any of these methods with a low power consumption, long life telematics system permitting the remote monitoring of a fixed or movable storage container and its contents and environment over long periods of time without intervention using the cell phone or Internet ISP or other wireless broadband systems is not believed to be available. With the availability of the systems described herein, storage containers or other material storage structures or housings placed anywhere in the world can be monitored from any other place in the world for material level, tampering, theft of contents or the entire container, fire, excessive temperature, usage, etc. without maintenance for several years.

Figure 1:
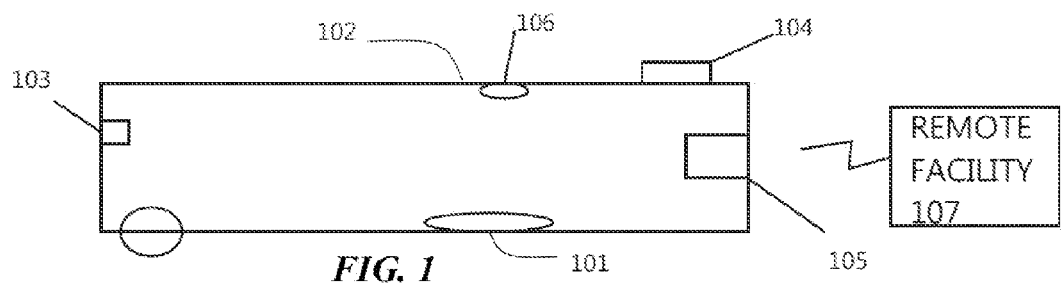
FIG. 1 is a schematic side view of a movable storage container, commonly known as a Frac tank, containing a level monitoring system in accordance with the invention.
Figure 2:
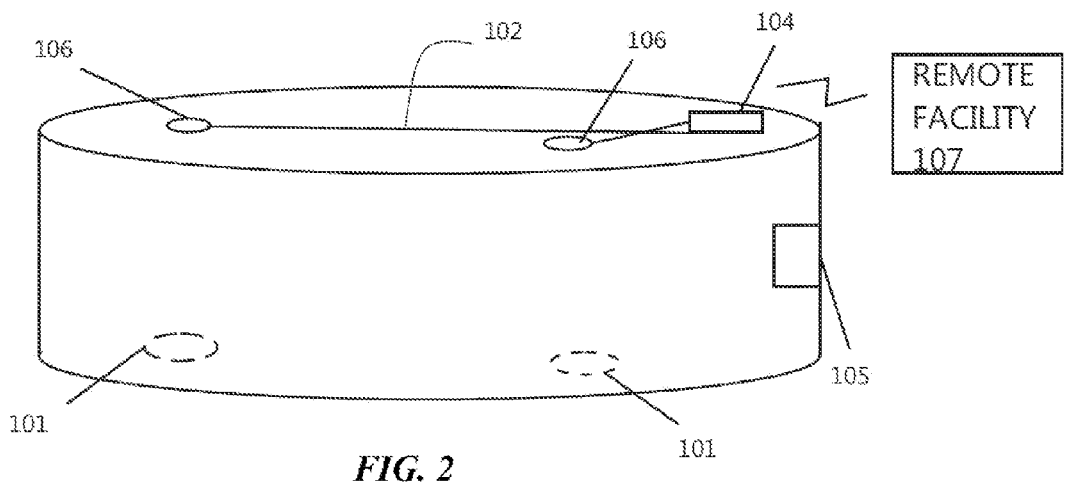
FIG. 2 is a perspective view of an oil or chemical storage container containing a level monitoring system in accordance with the invention.

FIG. 1 is a side view of a Frac tank, such as supplied by e-Container Inc, of Massillon, Ohio, containing a level monitoring system and other sensors in accordance with the invention. FIG. 2 is a perspective view of an oil or chemical storage container containing a level monitoring system in accordance with the invention.

One preferred implementation of such a system for use with the Frac tank as schematically shown in FIG. 1 and the storage container as schematically shown in FIG. 2 is described with reference to FIGS. 3 and 4. In a most basic embodiment, an interior sensor system is arranged on a housing of the storage container or other material-storage structure and is configured to obtain information about any material in the interior of the housing, this information might be the presence of material in the container and/or the level of material in the container. A location determining system can also be arranged on or in the housing which monitors the location of the container, i.e., either is provided with an initial position and monitors change in that position or is provided with a device to enable it to determine its position. One such system assigns an identification number or other reference to the container and its position is registered when it is installed or moved. A communication system is coupled to the interior sensor system and the location determining system, and possibly even arranged on the housing itself, and transmits the information about the material in the interior of the housing and the location of ID of the container to a remote facility. The remote facility may be any facility which monitors the contents of the container, including possibly multiple facilities, all of which are concerned with the contents and condition of the container or the material therein. Instead of being mounted on the housing itself, the communication system may be arranged in close proximity to the housing and coupled to the interior sensor system and location determining system via wires or in a wireless manner. An example of such a system is where a level sensor is present on a truck trailer and the telematics transmitter on the tractor.

The level measurement in this example is accomplished using one or more wave-receiving devices 106, such as an ultrasonic transducer manufactured by Murata and described in the '572 patent mentioned above, and a reference target 101, which may donut-shaped. Each wave-receiving device 106 directs waves at an upper surface of the material when present in the interior of the container, when it is a wave transmitter, or alternatively receives waves, e.g., electromagnetic waves, from the material when it is, for example, an optical imager. Preferably, each wave receiving device 106 is sealed into an enclosure which prevents it from being damaged by the material, i.e., liquid or gas in the interior of the housing of the container.

Each wave-receiving device 106 can be mounted to or in the top wall 102 on the inside of any of the above mentioned containers such that its operative field of view extends downward toward the material in the container, whether downward toward the bottom of the container or at an angle to a side of the container. A control unit/processor is provided to control the manner in which each wave-receiving device 106 emits ultrasonic pulses, and the control unit/processor is shown schematically as 104, which unit also includes a location determining system as described above. The location determining system and control unit/processor 104 may be arranged apart from one another, and possibly alongside the housing of the container or on another face of the container, e.g., a side of the container.

When the wave-receiving device 106 is an ultrasonic transducer, e.g., an ultrasonic wave transmitter/receiver, each time the wave-transducer 106 emits an ultrasonic pulse, a reflection is obtained from the material surface and also from the reference target 101. Received reflections are analyzed by the control unit/processor 104. In one embodiment, the control unit/processor 104 is provided with information about the distance between the wave-receiving device 106 and the reference target 101 in its field of view. In this case, since the location of the reference target 101 relative to the wave-receiving device 106 and the speed of sound in the container can be calculated or otherwise determined, the effects of temperature and gas chemical makeup can be determined. A ratio of the echo times from the target 101 and material enables the control unit/processor 104 coupled to the wave-receiving device 106 to determine the location of the material surface. Knowing also the dimensions of the container, the control unit/processor 104 can also determine the quantity of material in the container. A key advantage therefore of this system is that it is independent of gas composition and temperature. Additional reference targets can of course be added if it is desired to take into account the effects in gradation in the speed of sound caused by either the temperature or gas composition. This system of course only measures the material level at one location, the location impacted by the transmitted ultrasonic waves, and thus some method of determining the rotations about the horizontal axes of the container may also be incorporated, at least for containers that are movable such as the Frac tank shown in FIG. 1. One method is to use multiple systems of the type described herein (noting multiple wave-receiving devices 106 in FIG. 2) or the incorporation of one or more tilt sensors 103 shown in FIG. 1, such as those manufactured by Fredriks of Huntingdon, Pa. and described in the '572 patent.

If the geometry of the container is known and the level of the material is measured at one appropriate point, then with the added information from a tilt or angle sensor 103, the quantity of the material in the container can be accurately determined. Indeed, it has been established that by using trained pattern recognition or other deterministic techniques, knowing only three parameters about a material container, it is possible to operatively and accurately determine the quantity of material in the container, even when the container is subject to inclination. This is discussed in U.S. Pat. No. 6,892, 572, incorporated by reference herein. Other more accurate angle gages are available as can be determined by one with ordinary skill in the art and the Fredriks sensors discussed herein are for illustration purposed only.

Figure 3:
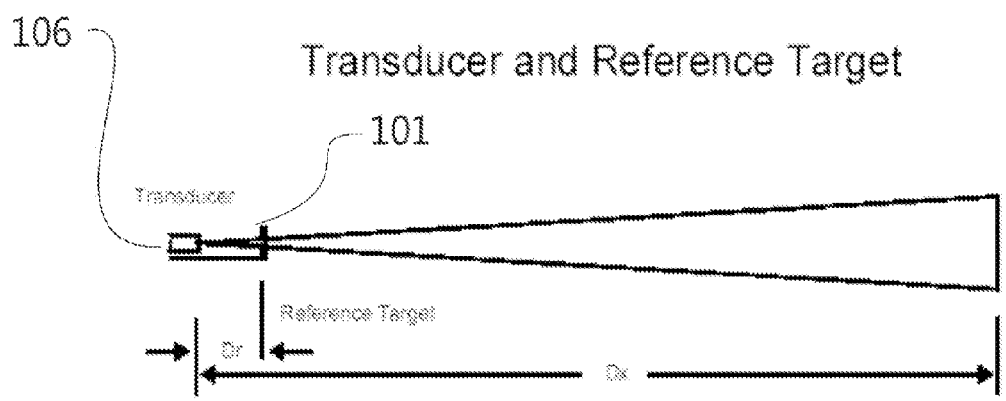
FIG. 3 shows one preferred method of determining the level of a material in a container that is independent on temperature or the speed of sound.
Figure 4:
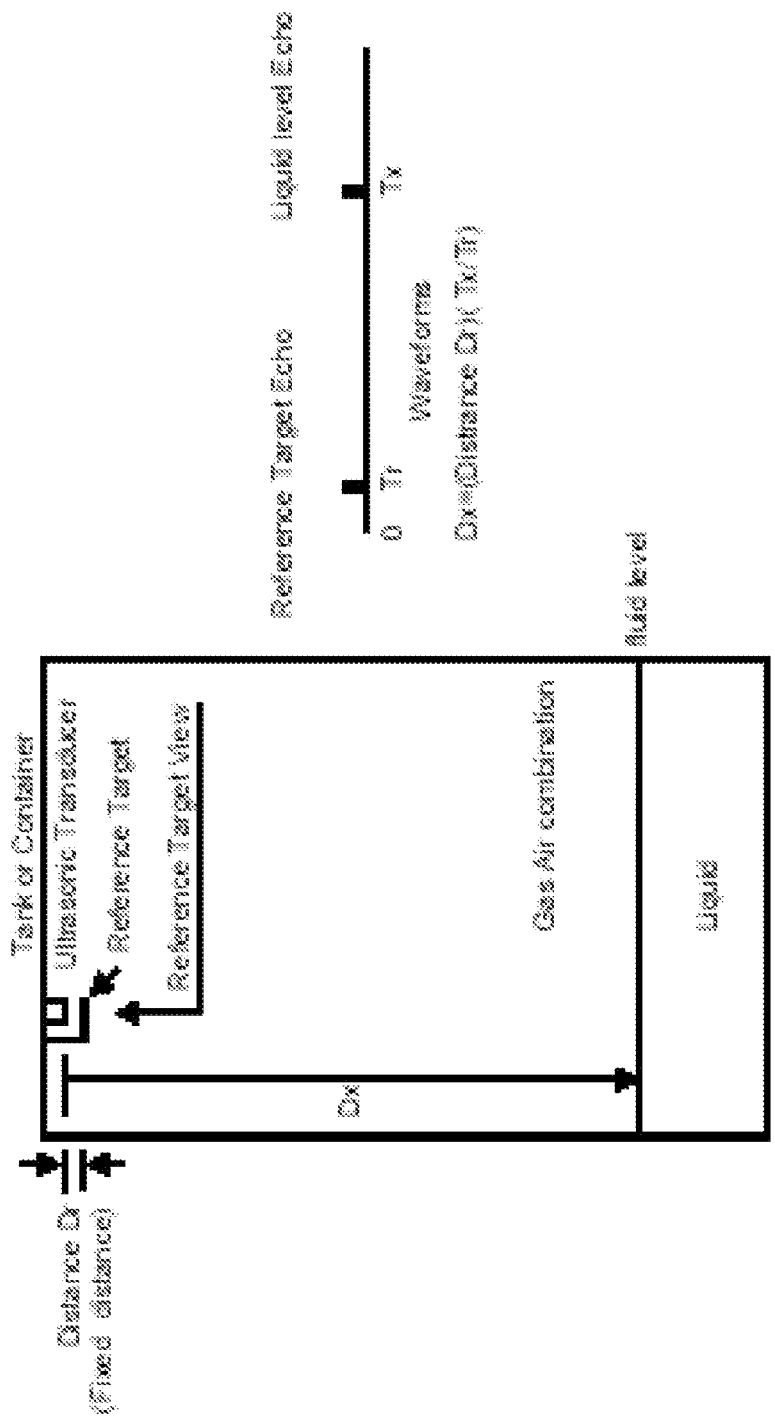
FIG. 4 is a schematic illustration of the method of FIG. 3.

FIG. 3 shows one preferred method of determining the level of a material in a container that is independent on temperature or the speed of sound. FIG. 4 is a schematic illustration of the method of FIG. 3.

In some embodiments, the control unit/processor 104 is arranged to compensate for thermal and/or gas density gradients in the interior of the container. Different ways in which the received waves can be analyzed and processed while compensating for thermal and/or gas density gradients are known to those skilled in the art. Compensation for gas density gradients is particularly appropriate when using ultrasonic sensors and thus the processor which receives information about the ultrasonic waves reflected from the upper surface of the material and determines the distance between the ultrasonic sensor and the upper surface of the material (which enables a determination of the level of material in the storage container) would also be programmed to compensate for such gas density gradients (possibly in a manner described above in section 1.3). Any additional gas density sensors which would be required to determine gaseous stratification of the area above the liquid may be mounted to the housing.

In an embodiment described above, each wave-receiving device 106 receives waves from the upper surface of the material and from its associated reference target 101 so that the control unit/processor 104 can analyze the waves and determine the level of material in the container, since it knows the distance between each wave-receiving device 106 and its associated reference target 101. In another embodiment, the control unit/processor 104 compares waves received by each wave-receiving device 106 at different times and obtains information about the material in the container based on the comparison of the waves received by the wave-receiving device 106 at different times. When multiple wave-receiving devices are provided, the control unit/processor analyzes waves received by the wave-receiving devices 106 and obtains information about the material in the container on the analysis of these waves.

Figure 13:
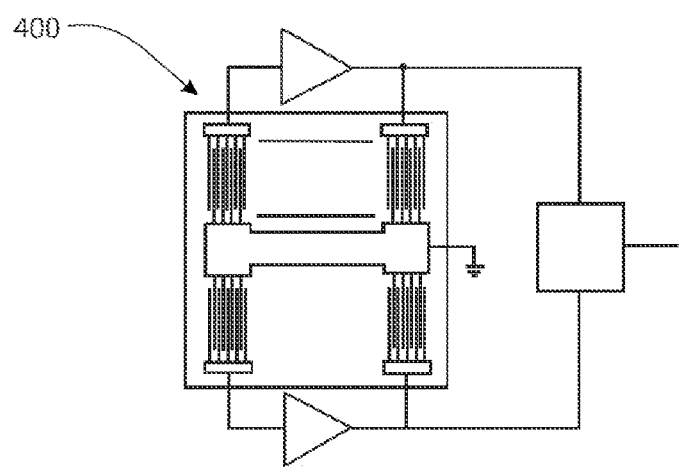
FIG. 13 is a detailed view of the SAW chemical sensor which can be placed in the lid of a container.

Other sensors can be incorporated into the storage container monitoring system including those described with regard to shipping containers or truck trailers elsewhere in the patents referenced herein. For example, low power chemical or biological sensors, such as illustrated in FIG. 13, can be incorporated to monitor the chemical nature of the contents of the container. Similarly, temperature, pressure or other sensors can be added such as a camera that monitors the environment surrounding the container and alerts the container owner when the container is approached or breached. Additional sensors include MIR, leakage detectors, sound, light, inertial sensors, radar, water presence or level sensors, etc. Magnetic or other sensors, for example, can detect the approach of a truck that might be used to move the container. As such, in other embodiments of the invention, the interior sensor system includes one or more additional sensors 105 for performing any one of a number of different functions, and which are coupled to the control unit/processor 104. For example, a chemical sensor may be provided to monitor the chemical nature of the material in the container, and an exterior or environmental sensor may be provided to monitor an environment around the container to obtain information about the environment around the container including, for example, the presence of flood waters. Additional sensors include a temperature sensor, a pressure sensor, a carbon dioxide sensor, a humidity sensor, a hydrocarbon sensor, a narcotics sensor, a mercury vapor sensor, a radioactivity sensor, a microphone, an electromagnetic wave sensor, electric or magnetic field sensor and a light sensor.

In some embodiments, additional sensors may be mounted on, in or around the storage container housing with a view toward improving the security of the storage container and the material therein. Such sensors include sound sensors, vibration sensors and light sensors, the output of which would be provided to the control unit/processor 104 which could analyze the output and enable a determination as to whether the storage container of material therein is being tampered with or otherwise subject to unauthorized use, conversion, removal or modification.

Other material level determining systems can also be used and all such systems are within the scope of this invention. Once a level system has been chosen, then it can be combined with a cell phone system using SMS, for example, or Internet-based monitoring system in the same or similar manner as the shipping container monitoring systems discussed elsewhere herein. Thus, once the interior sensor system in any of the embodiments described above obtains information about the material in the container and optional additional information about the container, it provides this information, periodically or upon receiving a signal, to a communication system which may also be housed in the same housing as control unit/processor 104. The communication system directs this information along with information about the location of the container obtained from the location determining system to one or more remote facilities 107, using for example, a satellite link, cell phone link, an internet link and the like.

To optimize monitoring of the container, the control unit/processor may include an initiation device for periodically initiating the wave receiving device(s) 106, and/or other sensors when present, to obtain information about the material in the container and/or the condition of the container. A wakeup sensor system may thus be provided for detecting the occurrence of an internal or external event, or the absence of an event for a time period, requiring a change in the frequency of monitoring of the container. The initiation device is coupled to the wakeup sensor system and arranged to change the rate at which it initiates the wave receiving device(s) 106 and/or other sensors to obtain information about the material in the container and/or the condition of the container in response to the detected occurrence of an internal or external event by the wakeup sensor system. The initiation device and wakeup sensor system may be integrated into the control unit/processor 104 or separate therefrom.

In one embodiment, a motion or vibration detection system is arranged to detect motion or vibration of the container or a part thereof. The interior sensor system, e.g., the wave-receiving device(s) 106, are coupled to the motion or vibration detection system and obtain information about the material of the interior of the housing only after the container or a part thereof is determined to have moved from a stationary position or vibrated. Similarly, a wakeup sensor system can be mounted on the housing of the container for detecting the occurrence of an internal or external event relating to the condition or location of the material in the housing or the container. The communication system may be coupled to the wakeup sensor system and arranged to transmit a signal relating to the detected occurrence of an internal or external event. Whenever desired or necessary, a memory unit may be coupled to the control unit/processor 104 or part thereof and stores data relating to the location of the container and the material in the interior of the housing. The motion or vibration detection system and wakeup sensor system may be integrated into the control unit/processor 104 or separate therefrom.

A motion sensor may be arranged on the housing for monitoring motion of the housing, when the housing is in particular a movable material storage container such as a Frac tank, and an alarm or warning system coupled to the motion sensor and which is activated when the motion sensor detects dangerous motion of the housing. The motion sensor and alarm or warning sensor system may be integrated into the control unit/processor 104 or separate therefrom.

The wave receiving device 106, or other interior sensor system component that obtains information about the level or quantity of material in the container, may also be configured to respond to a detection of a change in the housing that usually is indicative of a probable change in the level or quantity of material in the container. For example, a pump may be opened or closed and this opening or closing movement detected and used to initiate an information obtaining stage of the interior sensor system. Pump sensors or other such sensing devices are known to those skilled in the art, and would be coupled to the control unit/processor 104 to effect the information obtaining stage.

The interior sensor system, e.g., the wave-receiving device(s) 106, the location determining system and the communication system preferably all have low power requirements. A battery, e.g., a rechargeable battery, a disposable battery, solar collector, other energy harvesting device or system, or a fuel cell, may be coupled to the interior sensor system, the location determining system and the communication system for providing power thereto.

In addition to information being obtained based on changes in the condition or state of the housing, it is also possible to cause the interior sensor system to obtain information upon receipt of a command from the remote facility 107. In this case, the link between the communications device in the control unit/processor 104 is bi-directional and allows for reception of a command from a remote facility 107 to cause the wave-receiving device(s) 106 to operate and obtain information about the material in the container. This information is subsequently transmitted to the remote facility 107. In another case, the interior sensor system includes a combination of optical and ultrasonic or other wave-type receiving devices, each such device being represented by reference numeral 106. An optical system 106 is mounted on the housing to characterize the contents in the container, e.g., determine the nature of the material, its identity or composition, and an ultrasonic system 106 is used to determine the material level. Both such systems would be coupled to the control unit/processor 104 which would coordinate information gathering by both systems and transmit messages to the remote facility 107 about the nature of the material and its level, along with a location or position indication obtained from the location determining system. Such an optical system may be as described herein and would generally include an optical sensor which obtains images of the material and can analyze the images to determine the nature of the material. This may be achieved using pattern recognition technologies.

In another embodiment, only optical systems are used, represented by reference numeral 106 in FIGS. 1 and 2, since an optical system could also determine the level of material in a container. In this case, one or more markings can be provided along the inner surface of the container, or on other members extending along the height of the container in the interior of the container. The optical system obtains images including the marking(s) and can analyze the images to determine the level of the material. In one particular embodiment, the optical system is designed to continuously or intermittently project scales on the inner surface of three walls of the housing, or at three different locations on the inner surface of the housing wall or walls, and obtain images of the wall(s) at the projected locations of the scales. This information is used to derive the level of material in the container, e.g., using a trained pattern recognition techniques such as a trained neural network or another deterministic system. Training of a neural network may involve obtaining images when different, but known, levels of material are present in the container, and the container is at different inclinations. Images are obtained for different container levels and different inclinations and input into a neural network generating program which provides a neural network algorithm which is capable of outputting a material level upon receiving images of the three projected scales or even without the use of projected scales.

In a preferred embodiment, a single ultrasonic wave-receiving device 106 is mounted to an inner surface of the housing and is sealed into an enclosure to prevent damage caused by any materials in the housing. A two axis tilt or angle sensor 105 is also mounted to the housing and this sensor 105 as well as the wave-receiving device 106 are coupled to the control unit/processor 104. The control unit/processor 104 receives signal corresponding to or representative of the waves received by the wave-receiving device 106, or information derived therefrom at the wave-receiving device 106, along with the information about inclination of the housing from the tilt sensor 105 and the location of the container from the location determining system and forms a message for transmission to the remote facility 107.

The remote facility 107 which monitors the storage containers can receive messages, e.g., via the Internet or a cell phone link, each containing the location of the container and information about the material therein. The remote facility 107 could also be designed to enable monitoring of selected ones or all of the storage containers via wave-receiving devices 206 if a bi-directional communications device is coupled to or part of the control unit/processor 104 associated with each storage container. A report about the storage containers can be compiled by a processor or control unit at the remote facility 107 and alarms or warnings provided to monitoring personnel if a problem is detected with any of the materials in the storage containers or a problem is detected with any of the storage containers. Alternately or additionally, a message can be sent if a storage container is empty or full and thus needs servicing. Such servicing may involve sending a truck to add or remove material or to remotely operate a valve, for example, which will either fill or empty the container as desired.

When the communication system in the control unit/processor 104 on the housing of the container allows for bi-directional communications, the container can be provided with one or more controlled systems or components which can be commanded by the remote facility 107 to undertake a specific action. This would be in addition to the ability of the remote facility 107 to command the interior sensor system, e.g., the wave receiving device(s) 106 to undertake a reading. Such controlled systems may be a fire extinguisher on the container or a cleaning system, a valving system and the like. Any such systems can be coupled to the control unit/processor 104 and commanded via the link to the remote facility 107. This therefore provides for remote control of systems on the container.

Figure 5:
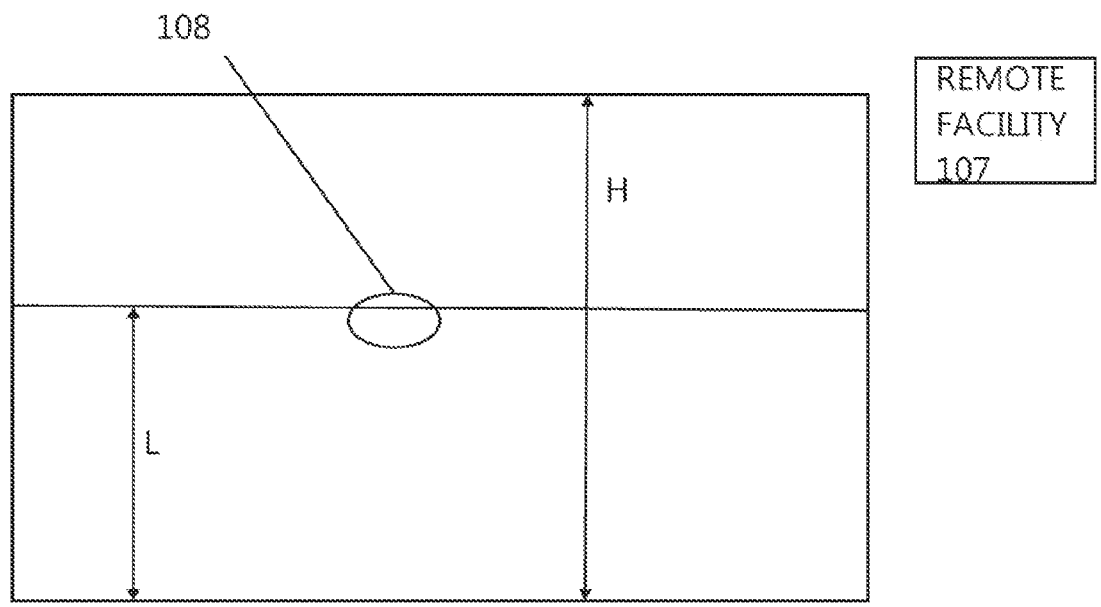
FIG. 5 is a cross-sectional view of an embodiment of a material level measuring system in accordance with the invention.
Figure 6:
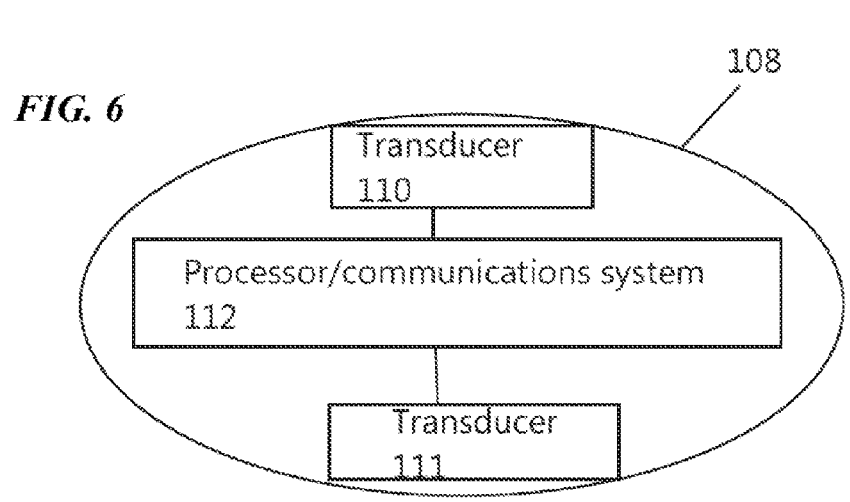
FIG. 6 is an enlarged view of the material level measuring system shown in FIG. 5.

Referring now to FIGS. 5 and 6, another embodiment of a material level measuring system in accordance with the invention for particular use with storage containers includes a buoyant housing 108 which floats on the liquid or other material in the storage container housing. Housing 108 can include a first transducer 110 arranged to face upward and a second transducer 111 arranged to face downward. This is facilitated by, for example, appropriate design of the shape and/or weight distribution of the housing 108 and its parts.

Transducer 110 may be an ultrasonic or RF transducer which is capable of providing information to enable a determination of or possibly actually determining the range of distance to the top of the storage container, i.e., the distance between the housing 108 and the top of the storage container. If transducer 110 is an ultrasonic transducer, it directs ultrasonic waves at the inner surface of the top wall of the storage container and receives reflected ultrasonic waves.

Transducer 111 may be an ultrasonic transducer which is capable of providing information to enable a determination of or possibly actually determining the range or distance to the bottom of the storage container. If transducer 111 is an ultrasonic transducer, it directs ultrasonic waves at the inner surface of the bottom wall of the storage container and receives reflected ultrasonic waves.

A processor/communications unit 112 is connected to transducers 110, 111 and, when the transducers 110, 111 only provide data about the reflected waves but not the range or distance information, the processor/communications unit 112 determines the range or distance between the housing 108 and both the top and bottom of the storage container. From the range or distance determinations, processor/communications unit 112 is thus capable of determining the level (L) of the liquid if the height (H) of the container is known (and provided to the processor/communications unit 112). The processor/communications unit 112 could also correct for other variables in the determinations, such as temperature, pressure and gas density as disclosed herein.

If the speed of sound in the liquid or the gas is provided to or otherwise determined by sensors connected to the processor/communications unit 112, it can then determine the material level using the data from only one of the transducer 110, 111. For example, if the speed of sound in the liquid is known, the processor/communications unit 112 can determine the level of material based on the data provided by transducer 111.

In one embodiment, a reference target is arranged in the field of view of transducer 110 and thus, only transducer 110 would be needed to enable a determination of the level of material in the container. In this case, housing 108 would not include transducer 111.

Processor/communications unit 112 includes a communications unit or system which communicates with the remote facility 107, either directly or indirectly, e.g., through an intermediate structure which receives wireless signals, or signals via a wire when present, from the processor/communications unit 112 indicative of the level of material in the container and relays them to the remote facility 107.

Additional methods for measuring the level of material in the storage containers may be used in the invention, such as those described in a book, Measurement and Control of Liquid Level. Any of these level measuring techniques may be used in the invention, when used in combination with a communications unit which is capable of forwarding the measured material level to a remote facility or engaging in bi-directional communications with a remote facility to enable the remote facility to initiate a liquid level measurement.

6. Monitoring of Other Vehicles Such as Cargo Containers, Truck Trailers and Railroad Cars Commercial systems are now available from companies such as SkyBitz Inc. 22455 David Dr., Suite 100, Sterling, Va. 20164, which will monitor the location of an asset anywhere on the surface of the earth. Each monitored asset contains a low cost GPS receiver and a satellite communication system. The system can be installed onto a truck, trailer, container, or other asset and it well periodically communicate with a low earth orbit (LEO) or a geostationary satellite (GEO) providing the satellite with its location as determined by the GPS receiver or a similar system such as the Skybitz Global Locating System (GLS). The entire system operates off of a battery, for example, and if the system transmits information to the satellite once per day, the battery can last many years before requiring replacement. Thus, the system can monitor the location of a trailer, for example, once per day, which is sufficient if trailer is stationary. The interrogation rate can be automatically increased if the trailer begins moving. Such a system can last for 2 to 10 years without requiring maintenance depending on design, usage and the environment. Even longer periods are possible if power is periodically or occasionally available to recharge the battery such as by vibration energy harvesting, solar cells, capacitive coupling, inductive coupling, RF or vehicle power. In some cases, an ultracapacitor or fuel cell can be used in conjunction with or in place of a battery.

The SkyBitz system by itself only provides information as to the location of a container and not information about its contents, environment, and/or other properties. At least one of the inventions disclosed herein disclosed herein is intended to provide this additional information, which can be coded typically into a few bytes and sent to the satellite along with the container location information and identification. The terms "shipping container" or "container" are used herein as a generic cargo holder and will include all cargo holders including standard and non-standard containers, boats, trucks, trailers, sheds, warehouses, storage facilities, containers, buildings or any other such object that has space and can hold cargo. All of these "containers" will be considered vehicles as defined above for the purposes of this disclosure.

One method of monitoring the space inside such a container is to use ultrasound such as disclosed in U.S. Pat. Nos. 5,653,462, 5,829,782, RE37260 (a reissue of U.S. Pat. No. 5,943,295), U.S. Pat. Nos. 5,901,978, 6,116,639, 6,186,537, 6,234,520, 6,254,127, 6,270,117, 6,283,503, 6,341,798, and 6,397,136 for monitoring the interior of a vehicle. Also, reference is made to U.S. Pat. No. 6,279,946, which discusses various ways to use an ultrasonic transducer while compensating for thermal gradients. Reference is also made to U.S. Pat. Nos. 5,653,462, 5,694,320, 5,822,707, 5,829,782, 5,835,613, 5,485, 5,488,802, 5,901,978, 6,039,139, 6,078,854, 6,081,757, 6,088,640, 6,116,639, 6,134,492, 6,141,432, 6,168,198, 6,186,537, 6,234,519, 6,234,520, 6,242,701, 6,253,134, 6,254,127, 6,270,116, 6,279,946, 6,283,503, 6,324,453, 6,325,414, 6,330,501, 6,331,014, RE37260, 6,393,133, 6,397,136, 6,412,813, 6,422,595, 6,452,870, 6,442,504, 6,445,988, and 6,442,465, which disclose inventions that may be incorporated into the invention(s) disclosed herein.

Consider now a standard shipping container that is used for shipping cargo by boat, trailer, or railroad. Such containers are nominally 8'w×8'h×20' or 40' long outside dimensions, however, a container 48' in length is also sometimes used. The inside dimensions are frequently around 4" less than the outside dimensions. In a simple interior container monitoring system, one or more ultrasonic transducers can be mounted on an interior part of the container adjacent the container's ceiling in a protective housing. Periodically, the ultrasonic transducers can emit a few cycles of ultrasound and receive reflected echoes of this ultrasound from walls and contents of the trailer. In some cases, especially for long containers, one or more transducers, typically at one end of the container, can send to one or more transducers located at, for example, the opposite end. Usually, however, the transmitters and receivers are located near each other. Due to the long distance that the ultrasound waves must travel especially in the 48 foot container, it is frequently desirable to repeat the send and receive sequence several times and to add or average the results. This has the effect of improving the signal to noise ratio. Note that the system disclosed herein and in the parent patents and applications is able to achieve such long sensing distances due to the principles disclosed herein. Competitive systems that are now beginning to enter the market have much shorter sensing distances and thus a key invention herein is the ability to achieve sensing distances in excess of 20 feet.

In many cases, several transducers are used for monitoring the vehicle, such as a container, that typically point in slightly different directions. This need not be the case and a movable mounting is also contemplated where the motion is accomplished by any convenient method such as a magnet, motor, etc.

Figure 9:
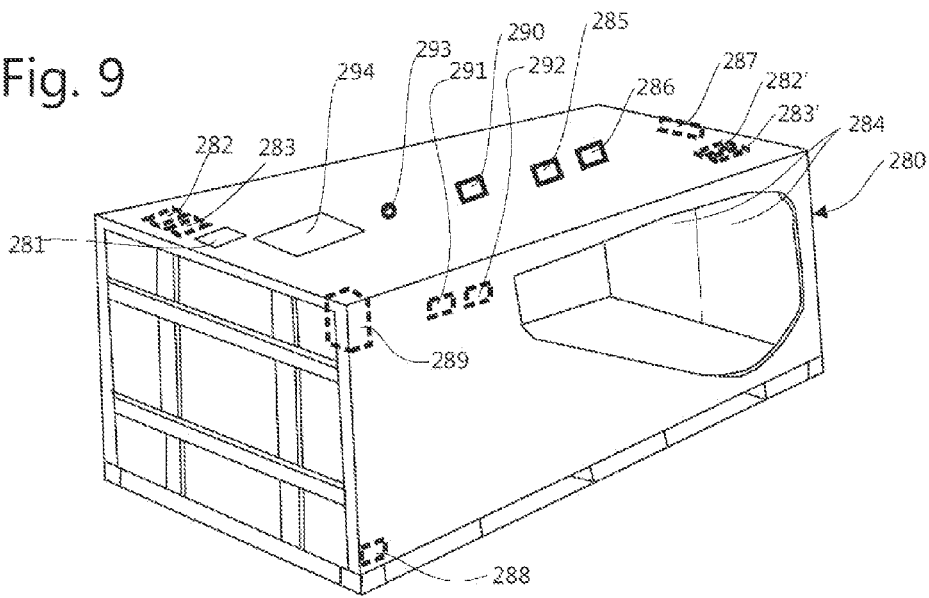
FIG. 9 is a perspective view showing a shipping container including one embodiment of the monitoring system in accordance with the present invention.

Referring to FIG. 9, a container 280 is shown including an interior sensor system 281 arranged to obtain information about contents in the interior of the container 280. The interior sensor system includes a wave transmitter 282 mounted at one end of the container 280 and which operatively transmits waves into the interior of the container 280 and a wave receiver 283 mounted adjacent the wave transmitter 282 and which operatively receives waves from the interior of the container 280. As shown, the transmitter 282 and receiver 283 are adjacent one another but such a positioning is not intended to limit the invention. The transmitter 282 and receiver 283 can be formed as a single transducer or may be spaced apart from one another. Multiple pairs of transmitter/receivers can also be provided, for example transmitter 282' and receiver 283' are located at an opposite end of the container 280 proximate the doors 284.

The interior sensor system 281 includes a processor coupled to the receiver 283, and optionally the transmitter 282, and which is resident on the container 280, for example, in the housing of the receiver 283 or in the housing of a communication system 285. The processor is programmed to compare waves received by each receiver 283, 283' at different times and analyze either the received waves individually or the received waves in comparison to or in relation to other received waves for the purpose of providing information about the contents in the interior of the container 280. The processor can employ pattern recognition techniques and as discussed more fully below, be designed to compensate for thermal gradients in the interior of the container 280. Information about the contents of the container 280, which may contain flowable material, may comprise the presence, quantity and/or motion of the material in the interior. The processor may be associated with a memory unit which can store data on the location of the container 280 and the analysis of the data from the interior sensor system 281.

The container 280 also can include a location determining system 286 which monitors the location of the container 280. To this end, the location determining system can be any asset locator in the prior art, which typically include a GPS or other GNSS receiver, transmitter and appropriate electronic hardware and software to enable the position of the container 280 to be determined using GPS or GNSS technology or other satellite or ground-based technology including those using the cell phone system or similar location based systems.

The communication system 285 is coupled to both the interior sensor system 281 and the location determining system 286 and transmits the information about the contents in the interior of the container 280 (obtained from the interior sensor system 281) and the location of the container 280 (obtained from the location determining system 286). This transmission may be to a remote facility wherein the information about the container 280 is stored, processed, counted, reviewed and/or monitored and/or retransmitted to another location, perhaps by way of the Internet.

The container 280 also can include a door or other port status sensor 287 arranged to detect when one or both doors 284, or other port, is/are opened or closed after having been opened. The door status sensor 287 may be an ultrasonic sensor which is positioned a fixed distance from the doors 284 and registers changes in the position of the doors 284. Alternately, other door status systems can be used such as those based on switches, magnetic sensors or other technologies. The door status sensor 287 can be programmed to associate an increase in the distance between the sensor 287 and each of the doors 284 and a subsequent decrease in the distance between the sensor 287 and that door 284 as an opening and subsequent closing of that door 284. In the alternative, a latching device can be provided to detect latching of each door 284 upon its closure. The door status sensor 287 is coupled to the interior sensor system 281, or at least to the transmitters 282,282' so that the transmitters 282,282' can be designed to transmit waves into the interior of the container 280 only when the door status sensor 287 detects when at least one door 284 is closed after having been opened. For other purposes, the ultrasonic sensors may be activated on opening of the door(s) in order to monitor the movement of objects or material into or out of the container, which might in turn be used to activate an RFID or bar code reading system or other object identification system when such systems are present.

When the ultrasonic transducers are first installed into the container 280 and the doors 284 closed, an initial pulse transmission can be initiated and the received signal stored to provide a vector of data that is representative of an empty container. To initiate the pulse transmission, an initiation device or function is provided in the interior sensor system 281, e.g., the door status sensor 287. At a subsequent time when contents have been added to the container (as possibly reflected in the opening and closing of the doors 284 as detected by the door status sensor 287), the ultrasonic transducers can be commanded to again issue a few cycles of ultrasound and record the reflections. If the second pattern is subtracted from the first pattern, or otherwise compared, in the processor the existence of additional contents in the container 280 will cause the signal to change, which thus causes the differential signal to change and the added contents detected. Vector as used herein with ultrasonic systems is a linear array of data values obtained by rectifying, taking the envelope and digitizing the returned signal as received by the transducer or other digital representation comprising at least a part of the returned signal.

When a container 280 is exposed to sunlight on its exterior top, a stable thermal gradient can occur inside the container 280 where the top of the container 280 near the ceiling is at a significantly higher temperature than the bottom of the container 280. This thermal gradient changes the density of the gas inside the container causing it to act as a lens to ultrasound that diffracts or bends the ultrasonic waves and can significantly affect the signals sensed by the receiver portions 283, 283' of the transducers. Thus, the vector of sensed data when the container is at a single uniform temperature will look significantly different from the vector of sensed data acquired within the same container when thermal gradients are present.

It is even possible for currents of heated air to occur within a container 280 if a side of the container is exposed to sunlight. Since these thermal gradients can substantially affect the vector, the system must be examined under a large variety of different thermal environments. This generally requires that the electronics be designed to mask somewhat the effects of the thermal gradients on the magnitude of the sensed waves while maintaining the positions of these waves in time. This can be accomplished as described in above-referenced patents and patent applications through the use, for example, of a logarithmic compression circuit. There are other methods of minimizing the effect on the reflected wave magnitudes that will accomplish substantially the same result some of which are disclosed elsewhere herein.

When the complicating aspects of thermal gradients are taken into account, in many cases a great deal of data must be taken with a large number of different occupancy situations to create a database of perhaps 10,000 to one million vectors each representing the different occupancy state of the container in a variety of thermal environments. This data can then be used to train a pattern recognition system such as a neural network, modular or combination neural network, cellular neural network, support vector machine, fuzzy logic system, Kalman filter system, sensor fusion system, data fusion system or other classification system. Since all containers of the type transported by ships, for example, are of standard sizes, only a few of these training exercises need to be conducted, typically one for each different geometry container. The process of adapting an ultrasonic occupancy monitoring system to a container or other space is described for automobile interior monitoring in above-referenced patents and patent applications, and therefore this process is not repeated here.

Other kinds of interior monitoring systems can be used to determine and characterize the contents of a space such as a container. One example uses a scanner and photocell 288, as in a laser radar system, and can be mounted near the floor of the container 280 and operated to scan the space above the floor in a plane located, for example, 10 cm above the floor. Since the distance to a reflecting wall of the container 280 can be determined and recorded for each angular position of the scanner, the distance to any occupying item will show up as a reflection from an object closer to the scanner and therefore a shadow graph of the contents of the container 10 cm above the floor can be obtained and used to partially categorize the contents of the container 280. Categorization of the contents of the container 280 may involve the use of pattern recognition technologies. Other locations of such a scanning system are possible.

In both of these examples, relatively little can be said about the contents of the container other then that something is present or that the container is empty or that the level is less than or more than a certain height. Frequently this is all that is required. A more sophisticated system can make use of one or more imagers (for example cameras) 289 mounted near the ceiling of the container, for example. Such imagers can be provided with a strobe flash and then commanded to make an image of the trailer interior at appropriate times. The output from such an imager 289 can also be analyzed by a pattern recognition system such as a neural network or equivalent, to reduce the information to a few bytes that can be sent to a central location via a cellphone, the Internet, a LEO or geostationary satellite, for example. As with the above ultrasonic example, one image can be subtracted from the empty container image and if anything remains then that is a representation of the contents that have been placed in the container. Also, various images can be subtracted to determine the changes in container contents when the doors are opened and material is added or removed or to determine changes in position of the contents. Various derivatives of this information can be extracted and sent by the telematics system to the appropriate location for monitoring or other purposes.

Each of the systems mentioned above can also be used to determine whether there is motion of the material within the container relative to the container. Motion of material within the container 280 would be reflected as differences between the waves received by the transducers (indicative of differences in distances between the transducer and the objects in the container) or images (indicative of differences between the position of objects in the images). Such motion can also aid in image segmentation which in turn can aid in the object identification process. This is particularly valuable if the container is occupied by life forms such as humans in addition to flowable material.

In the system of FIG. 9, wires (not shown) can be used to connect the various sensors and devices. It is contemplated that all of the units in the monitoring system can be coupled together wirelessly, using for example the Bluetooth, WI-FI or other protocol.

If an inertial device 290 is also incorporated, such as the MEMSIC dual axis accelerometer, an inertial measurement unit or just an accelerometer, which can provide information as to the accelerations of the container 280, then this relative motion can be determined by the processor and it can be ascertained whether this relative motion is caused by acceleration of the container 280, which may indicate loose cargo, and/or whether the motion is caused by the sensed occupying item. In latter case, a conclusion can perhaps be reached that container is occupied by a life form such as an animal or human. Additionally, it may be desirable to place sensors on an item of cargo itself since damage to the cargo could occur from excessive acceleration, shock, temperature, vibration, etc. regardless of whether the same stimulus was experienced by the entire container. A loose item of cargo, for example, may be impacting the monitored item of cargo and damaging it. Relative motion can also be sensed in some cases from outside of the container through the use of accelerometers, microphones, MIR (Micropower Impulse Radar), a terahertz or other electromagnetic scanner. Note that all such sensors regardless of where they are placed are contemplated herein and are part of the present inventions.

Chemical sensors 291 based on surface acoustic wave (SAW), as shown in FIG. 13, or other technology can in many cases be designed to sense the presence of certain vapors in the atmosphere and can do so at very low power. A properly designed SAW or equivalent sensing device, for example, can measure acceleration, angular rate, strain, temperature, pressure, carbon dioxide concentration, humidity, hydrocarbon concentration, and the presence or concentration of many other chemicals. A separate SAW or similar device may be needed for each chemical species (or in some cases each class of chemicals) where detection is desired. The devices, however, can be quite small and can be designed to use very little power. Such a system of SAW or equivalent devices can be used to measure the existence of certain chemical vapors in the atmosphere of the container much like a low power electronic nose. In some cases, it can be used to determine whether a carbon dioxide source such as a human is in the container. Such chemical sensing devices can also be designed, for example, to monitor for many other chemicals including some narcotics, hydrocarbons, mercury vapor, and other hazardous chemicals including some representative vapors of explosives or some weapons of mass destruction. With additional research, SAW or similar devices can also be designed or augmented to sense the presence of radioactive materials, and perhaps some biological materials such as smallpox or anthrax. In many cases, such SAW devices do not now exist, however, researchers believe that given the proper motivation that such devices can be created. Thus, SAW or equivalent based systems can monitor a great many dangerous and hazardous materials that may be either legally or illegally occupying space within a container, for example. In particular, the existence of spills or leakages from the cargo can be detected in time to perhaps save damage to other cargo either within the container or in an adjacent container. Although SAW devices have in particular been described, other low power devices using battery or RF power can also be used where necessary. Only a small number of examples are presented of the general application of the SAW, or RFID, technology to vehicles. Such SAW devices are disclosed in more detail in the patents referenced elsewhere herein and illustrated generally at 400 in FIG. 13.

Another technology that can be used in place of the SAW chemical sensors is based on MEMS. A two-dimensional array of very small cantilevered beams can be formed using MEMS etching technology and each of the beams can be coated with a reagent that reacts with a known chemical or biological species. In the presence of such a substance, the mass of the beam will increase as the reactant absorbs the chemical or biological substance. This mass increase in turn affects the natural frequency of the beam and thus the mass increase can be measured indicating the presence of the substance. Since reactants often react with a variety of substances with varying degrees of absorption, the pattern of natural frequency changes on a variety of beams can be analyzed using neural networks, for example, to determine what species or what relative concentration of a group of species is present. Such a device has recently been developed, for examples, for analyzing French perfumes.

Other sensors that can be designed to operate under very low power levels include microphones 292 and light sensors 293 or sensors sensitive to other frequencies in the electromagnetic spectrum as the need arises. The light sensors 293 could be designed to cause activation of the interior sensor system 281 when the container is being switched from a dark condition (normally closed) to a light situation (when the door or other aperture is opened), or vice versa. A flashlight could also activate the light sensor 293.

Instead of one or more batteries providing power to the interior sensor system 281, the communication system 285 and the location determining system 286, solar power or other energy harvesting system or device can be used. In this case, one or more solar panels 294 are attached to the upper wall of the container 280 (see FIG. 9) and electrically coupled to the various power-requiring components of the monitoring system. A battery or capacitor can thus be recharged. In the alternative, since the solar panel(s) 294 will not always be exposed to sunlight, a rechargeable battery can be provided which is charged by the solar panel 294 when the solar panels are exposed to sunlight. A battery could also be provided in the event that the solar panel 294 does not receive sufficient light to power the components of the monitoring system. In a similar manner, power can temporarily be supplied by a vehicle such as a tractor either by a direct connection to the tractor power or though capacitive, inductive or RF coupling power transmission systems. As above, an ultracapacitor can be used instead of a battery and energy harvesting can be used if there is a source of energy such as light or vibration in the environment.

In some cases, a container is thought to be empty when in fact it is being surreptitiously used for purposes beyond the desires of the container owner or law enforcement authorities. The various transducers that can be used to monitor interior of a container as described above, plus others, can also be used to allow the trailer or container owner to periodically monitor the use of his property.

7. Monitoring the Entire Asset

Monitoring of the interior of the container has been described above. If the container is idle, there may not be a need to frequently monitor the status of the container interior or exterior until some event happens. Thus, all monitoring systems on the container can be placed in the sleep mode until some event such as a door opening, motion or vibration of the container takes place, i.e., monitoring occurs only when an event is detected, such as motion or vibration of the container, i.e., immediately after such an event for a predefined period of time. Other wakeup events could include the opening of the doors, the sensing of light or a change in the interior temperature of the container above a reference level, for example. When any of these chosen events occurs, the system can be instructed to change the monitoring rate (e.g., reduce the interval between times when monitoring is performed) and to immediately transmit a signal to the preferred communication system, or respond to a telematics signal, for example. Such an event may signal to the container owner that a robbery is in progress either of the interior contents of the container or of the entire container. It also can signal that the contents of the container are in danger of being destroyed through temperature or excessive motion or that the container is being misappropriated for some unauthorized use. A ubiquitous cellphone or internet based communications system is a preferred telematics system.

Figure 10:
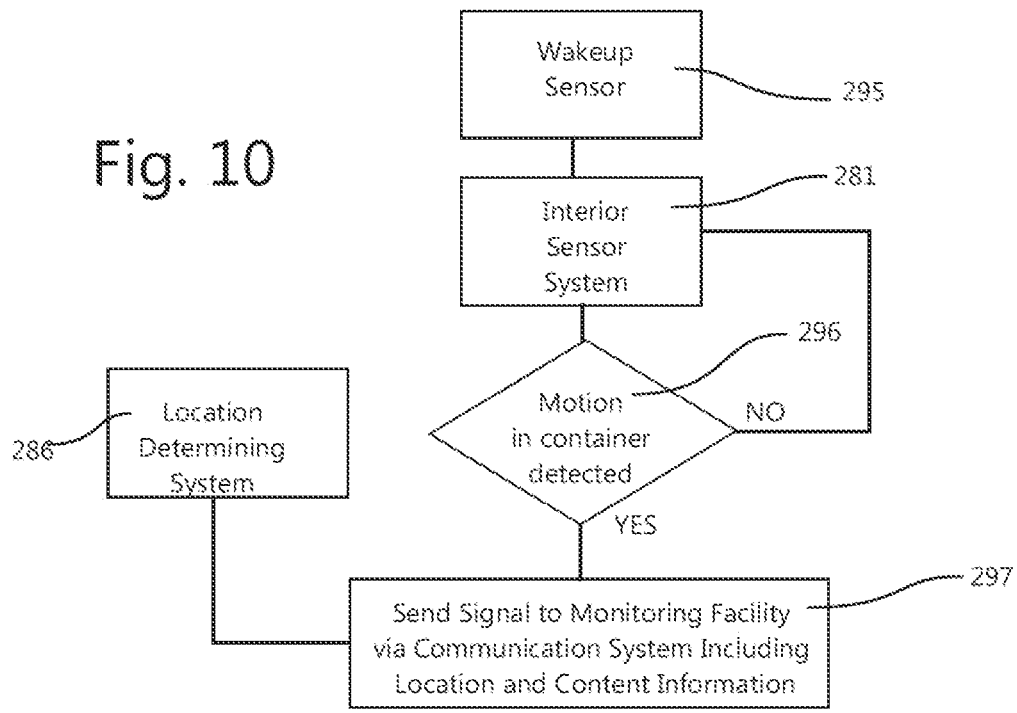
FIG. 10 is a flow chart showing one manner in which a container is monitored in accordance with the invention.

FIG. 10 shows a flowchart of the manner in which container 280 may be monitored by personnel or a computer program at a remote facility for the purpose of detecting unauthorized entry into the container and possible theft of the contents of the container 280. Initially, the wakeup sensor 295 detects motion, sound, light or vibration including motion of the doors 284, or any other change of the condition of the container 280 from a stationary or expected position. The wakeup sensor 295 can be designed to provide a signal indicative of motion only after a fixed time delay, i.e., a period of "sleep". In this manner, the wakeup sensor would not be activated repeatedly in traffic stop and go situations. A similar system would also be applicable for storage containers.

The wakeup sensor 295 initiates the interior sensor system 281 to perform the analysis of the contents in the interior of the container, e.g., send waves into the interior, receive waves and then process the received waves. If motion in the interior of the container is not detected at 296, then the interior sensor system 281 may be designed to continue to monitor the interior of the container, for example, by periodically re-sending waves into the interior of the container. If motion is detected at 296, then a signal is sent at 297 to a monitoring facility via the communication system 285 and which includes the location of the container 280 obtained from the location determining system 286 or by the ID for a permanently fixed container or other asset, structure or storage facility or container. In this manner, if the motion is determined to deviate from the expected handling of the container 280, appropriate law enforcement personnel can be summoned to investigate.

When it is known and expected that the container should be in motion, monitoring of this motion can still be important. An unexpected vibration could signal the start of a failure of the chassis tire, for example, or failure of the attachment to the chassis or the attachment of the chassis to the tractor. Similarly, an unexpected tilt angle of the container may signify a dangerous situation that could lead to a rollover accident and an unexpected shock could indicate an accident has occurred. Various sensors that can be used to monitor the motion of the container include gyroscopes, accelerometers and tilt sensors. An IMU (Inertial Measurement Unit) containing for example three accelerometers and three gyroscopes can be used.

In some cases, the container or the chassis can be provided with weight sensors that measure the total weight of the cargo as well as the distribution of weight. By monitoring changes in the weight distribution as the vehicle is traveling, an indication can result that the contents within the trailer are shifting which could cause damage to the cargo. An alternate method is to put weight sensors in the floor or as a mat on the floor of the vehicle. The mat design can use the bladder principles described in one or more of the patents referenced herein for weighing vehicle occupants using, in most cases, multiple chambers. Strain gages can also be configured to measure the weight of container contents. An alternate approach is to use inertial sensors such as accelerometers and gyroscopes to measure the motion of the vehicle as it travels. If the characteristics of the input accelerations (linear and angular) are known from a map, for example, or by measuring them on the chassis then the inertial properties of the container can be determined and thus the load that the container contains. This is an alternate method of determining the contents of a container. If several (usually 3) accelerometers and several (usually 3) gyroscopes are used together in a single package then this is known as an inertial measurement unit (IMU). If a source of position is also known such as from a GPS system then the errors inherent in the IMU can be corrected using a Kalman filter or neural network.

Other container and chassis monitoring can include the attachment of a trailer to a tractor, the attachment of electrical and/or communication connections, and the status of the doors to the container. If the doors are opened when this is not expected, this could be an indication of a criminal activity underway. Several types of security seals are available including reusable seals that indicate when the door is open or closed or if it was ever opened during transit, or single use seals that are destroyed during the process of opening the container.

Another application of monitoring the entire asset would be to incorporate a diagnostic module into the asset. Frequently, the asset may have operating parts, e.g., if it is a refrigerated and contains a refrigeration unit. To this end, sensors can be installed on the asset and monitored using pattern recognition techniques as disclosed in U.S. Pat. Nos. 5,809,437 and 6,175,787. As such, various sensors would be placed on the container 280 and used to determine problems with the container 280 which might cause it to operate abnormally, e.g., if the refrigeration unit were about to fail because of a refrigerant leak. In this case, the information about the expected failure of the refrigeration unit could be transmitted to a facility and maintenance of the refrigeration unit could be scheduled.

It can also be desirable to detect unauthorized entry into container, which could be by cutting with a torch, or motorized saw, grinding, or blasting through the wall, ceiling, or floor of the container. This event can be detected by one or more of the following methods:

1. A light sensor which measures any part of the visible or infrared part of the spectrum and is calibrated to the ambient light inside the container when the door is closed and which then triggers when light is detected above ambient levels and door is closed.
2. A vibration sensor attached to wall of container which triggers on vibrations of an amplitude and/or frequency signature indicative of forced entry into the container. The duration of signal would also be a factor to consider. The algorithm could be derived from observations and tests or it could use a pattern recognition approach such as Neural Networks.
3. An infrared or carbon dioxide sensor could be used to detect human presence, although a carbon dioxide sensor would probably require a prolonged exposure.
4. Various motion sensors as discussed above can also be used, but would need to be resistant to triggering on motion typical of cargo transport. Thus a trained pattern recognition algorithm might be necessary.

5. The interior of the container can be flooded with waves (ultrasonic or electromagnetic) and the return signature evaluated by a pattern recognition system such as a neural network trained to recognize changes consistent with the removal of cargo or the presence of a person or people. Alternately the mere fact that the pattern was changing could be indicative of human presence.

As discussed above and below, information from entry/person detector could be sent to communication network to notify interested parties of current status. Alternatively or additionally, an audible alarm may be sounded and/or a photo could also be taken to identify the intruder. Additionally or alternatively, motion sensors such as an accelerometer on a wall or floor of a vehicle such as a container or an ultrasonic or optical based motion detector such as used to turn on residential lights and the like, can also be used to detect intrusion into a vehicle and thus are contemplated herein. Such sensors can be mounted at any of the preferred locations disclosed herein or elsewhere in or on the vehicle. If a container, for example, is closed, a photocell connected to a pattern recognition system such as a neural network, for example can be trained to be sensitive to very minute changes in light such as would occur when an intruder opens a door or cuts a hole in a wall, ceiling or the floor of a vehicle even on a dark night. Even if there are holes in the vehicle that allow light to enter, the rate of change of this illumination can be detected and used as an indication of an intrusion.

It is noteworthy that systems based on the disclosure above can be configured to monitor construction machinery to prevent theft or at least to notify others that a theft is in progress.

8. Recording

In many cases, it is desirable to obtain and record additional information about the cargo container and its contents. As mentioned above, the weight of the container with its contents and the distribution and changes in this weight distribution could be valuable for a safety authority investigating an accident, for highway authorities monitoring gross vehicle weight, for container owners who charge by the used capacity, and others. The environment that the container and its contents have been subjected to could also be significant information. Such things as whether the container was flooded, exposed to a spill or leakage of a hazardous material, exposed to excessive heat or cold, shocks, vibration etc. can be important historical factors for the container affecting its useful life, establishing liability for damages etc. For example, a continuous monitoring of container interior temperature could be significant for perishable cargo and for establishing liability.

Figure 11A:
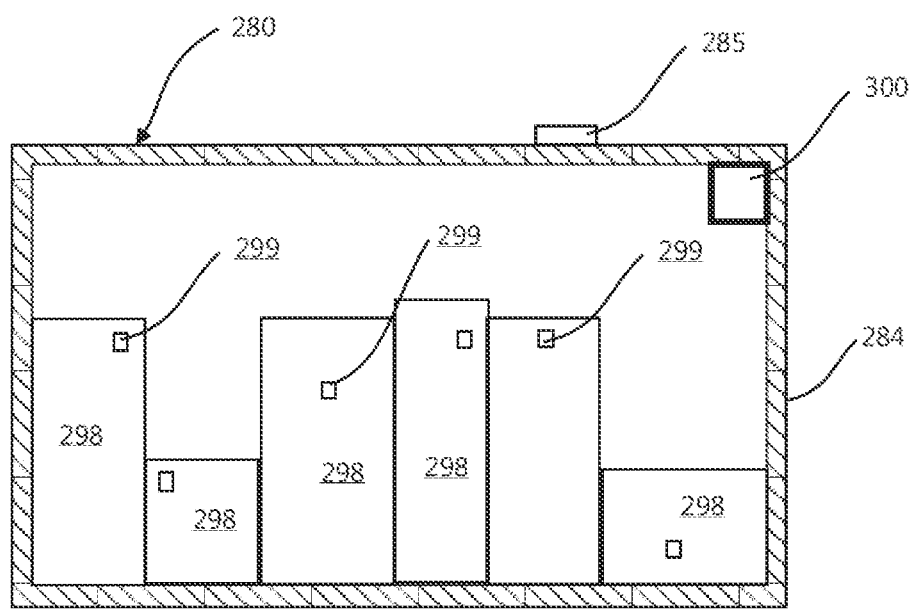
FIG. 11A is a cross-sectional view of a container showing the use of RFID technology in a monitoring system and method in accordance with the invention.

With reference to FIG. 11A, in some cases, the individual cargo items 298 can be tagged with RFID or SAW tags 299 and the presence of this cargo in the container 280 could be valuable information to the owner of the cargo. One or more sensors on the container that periodically read RFID tags could be required, such as one or more RFID interrogators 300 which periodically sends a signal which will cause the RFID tags 299 to generate a responsive signal. The responsive signal generated by the RFID tags 299 will contain information about the cargo item on which the RFID tag 299 is placed. Multiple interrogators or at least multiple antennas may be required depending on the size of the container. The RFID can be based on a SAW thus providing greater range for a passive system or it can also be provided with an internal battery or ultracapacitor for even greater range. Energy harvesting can also be used if appropriate.

Figure 11B:
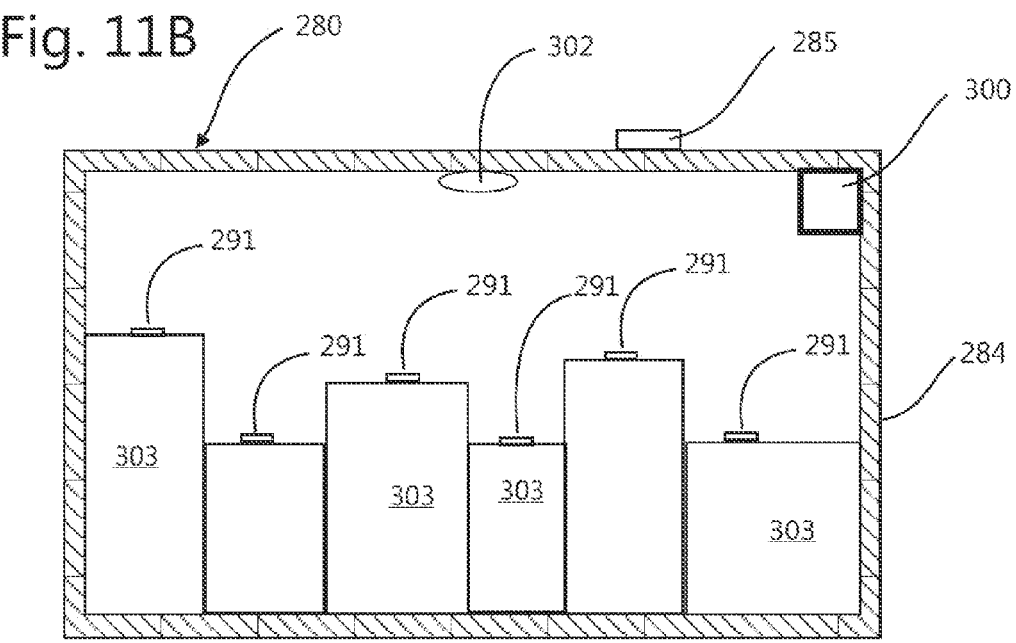
FIG. 11B is a cross-sectional view of a container showing the use of barcode technology in a monitoring system and method in accordance with the invention.

Similarly, for certain types of cargo, a barcode system might acceptable, or another optically readable identification code. The cargo items would have to be placed so that the identification codes are readable, i.e., when a beam of light is directed over the identification codes, a pattern of light is generated which contains information about the cargo item. As shown in FIG. 11B, the cargo items in this case are boxes having an equal height so that a space remains between the top of the boxes 301 and the ceiling of the container 280. One or more optical scanners 302, including a light transmitter and receiver, are arranged on the ceiling of the container and can be arranged to scan the upper surfaces of the boxes 303, possibly by moving the length of the container 280, or through a plurality of such sensors. During such a scan, patterns of light are reflected from the barcodes 301 on the upper surfaces of the boxes 303 and received by the optical scanner 302. The patterns of light contain information about the cargo items in the boxes 303. Receivers can be arranged at multiple locations along the ceiling. Other arrangements to ensure that a light beam traverses a barcode 301 and is received by a receiver can also be applied in accordance with the invention. As discussed above, other tag technologies can be used if appropriate such as those based of magnetic wires.

FIGS. 11A and 11B each illustrate a few large tagged items and thus are not flowable. However, a large number of small items can be similarly tagged which can be dumped into or out of a container and thus tagging is not inconsistent with flowability.

The ability to read barcodes and RFID tags provides the capability of the more closely tracking of packages for such organizations as UPS, Federal Express, the U.S. Postal Service and their customers. Now, in some cases, the company can ascertain that a given package is in fact on a particular truck or cargo transporter and also know the exact location of the transporter.

Frequently, a trailer or container has certain hardware such as bins of bulk material or racks for automotive parts, for example, that are required to stay with the container. During unloading of the cargo these bins or racks, or other sub-containers, could be removed from the container and not returned. If the container system knows to check for the existence of these racks, then this error can be eliminated. Frequently, the racks are of greater value then the cargo they transport. Using RFID tags and a simple interrogator mounted on the ceiling of the container perhaps near the entrance, enables monitoring of parts that are taken in or are removed from the container and associated with the location of container. By this method, pilferage of valuable or dangerous cargo can at least be tracked.

Containers constructed in accordance with the invention will frequently have a direct method of transmitting information to a remote site. Typically, the contents of the container are more valuable than the truck or chassis for the case of when the container is not a trailer. If the tractor, train, plane or ship that is transporting the container is experiencing difficulties, then this information can be transmitted to the remote site and thus to the container, carrier, or cargo owner or agent for attention. Information indicating a problem with carrier (railroad, tractor, plane, boat) may be sensed and reported onto a bus such as CAN bus which can be attached either wirelessly or by wires to the container. Alternately, sensors on the container can determine through vibrations etc. that the carrier may be experiencing problems. The reporting of problems with the vehicle can come from dedicated sensors or from a general diagnostic system such as described in U.S. Pat. Nos. 5,809,437 and 6,175,787, and herein. Whatever the source of the diagnostic information, especially when valuable or dangerous cargo is involved, this information in coded form can be transmitted to a remote site as discussed above.

Other information that can be recorded by container includes the identification of the boat, railroad car, or tractor and operator or driver.

The experiences of the container can be recorded over time as a container history record to help in life cycle analysis to determine when a container needs refurbishing, for example. This history in coded form could reside on a memory that is resident on the container or preferably the information can be stored on a computer file associated with that container in a database. The mere knowledge of where a container has been, for example, may aid law enforcement authorities to determine which containers are most likely to contain illegal contraband.

The pertinent information relative to a container can be stored on a tag that is associated and physically connected to the container. This tag may be of the type that can be interrogated remotely to retrieve its contents. Such a tag, for example, could contain information as to when and where the container was most recently opened and the contents of the container. Thus, as containers enter a port, their tags can each be interrogated to determine their expected contents and also to give a warning for those containers that should be inspected more thoroughly. In most cases, the tag information will not reside on the container but in fact will be on a computer file accessible by those who have an authorization to interrogate the file. Thus, the container need only have a unique identification number that cannot easily be destroyed, changed or otherwise tampered with. These can be visual and painted on the outside of the container or an RFID, barcode or other object identification system can be used. Again, the tags can be based on passive SAW technology or could contain a battery or ultracapacitor for greater range. The tag can be in a sleep mode until receiving a wakeup call to further conserve battery power.

Figure 12:
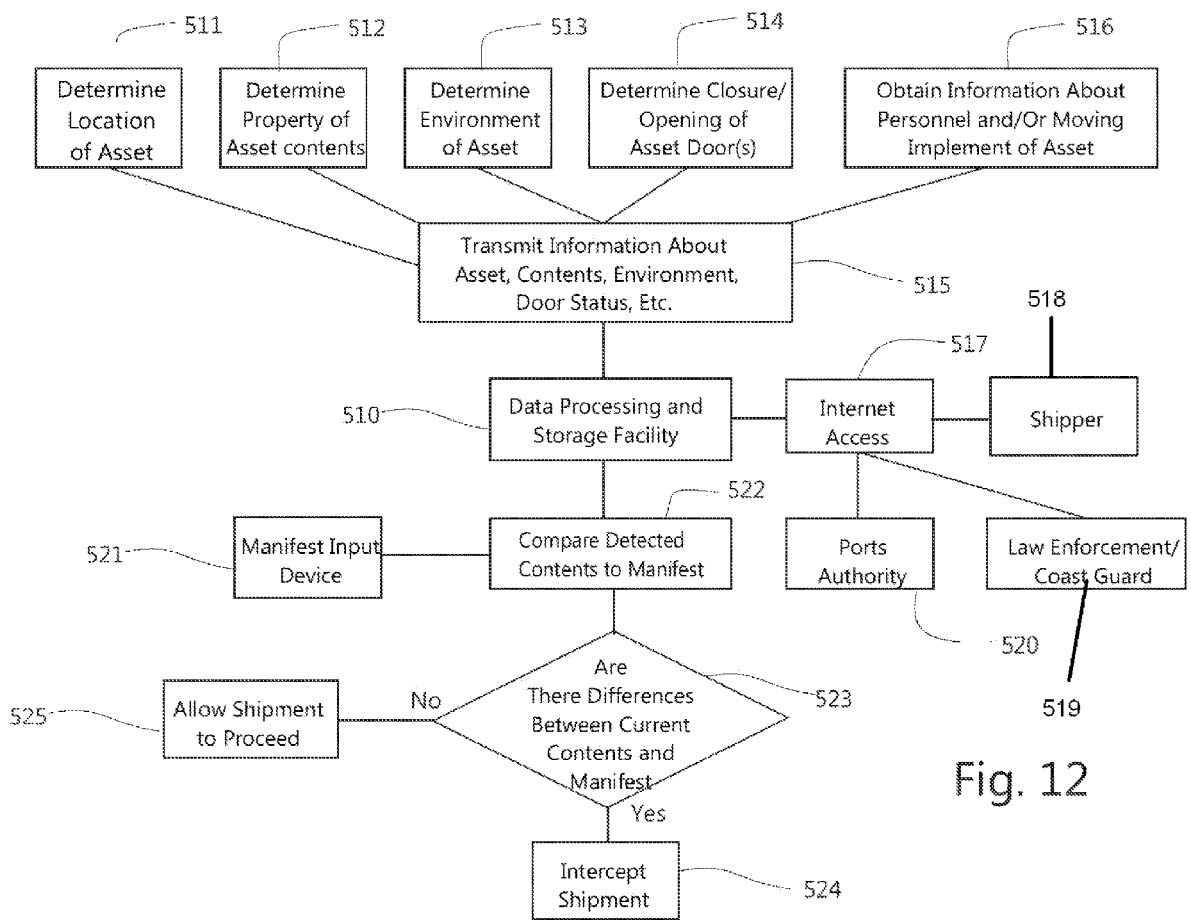
FIG. 12 is a flow chart showing one manner in which multiple assets are monitored in accordance with the invention.

FIG. 12 shows a flow chart of the manner in which multiple assets may be monitored using a data processing and storage facility 510, each asset having a unique identification code. The location of each asset is determined at 511, along with one or more properties or characteristics of the contents of each asset at 512, one or more properties of the environment of each asset at 513, and/or the opening and/or closing of the doors of each asset at 514. This information is transmitted to the data processing and storage facility 510 as represented by 515 with the identification code. Information about the implement being used to transport the asset and the individual(s) or company or companies involved in the transport of the asset can also be transmitted to the facility as represented by 516. This latter information could be entered by an input device attached to the asset.

The data processing and storage facility 510 is connected to the Internet at 517 to enable shippers 518 to check the location and progress of the asset, the contents of the asset, the environment of the asset, whether the doors are being opened and closed impermissibly and the individual and companies handling the asset, all of which may be stored in one or more databases at the data processing and storage facility 510 or otherwise accessible to the data processing and storage facility 510. The data processing and storage facility 510 may also be configured, e.g., using a processor and communications system thereat and software executed by the processor, to prepare reports about one or more selected containers and enable access to the prepared reports by remote users, e.g., the shippers 518, ports authority 520 and law enforcement personnel 519. The remote users would be able to use their terminals to access the data processing and storage facility 510 via the Internet and receive reports about their monitored containers.

The same information, or a subset of this information, can also be accessed by law enforcement personnel at 519 and maritime/port authorities at 520, and possibly stored in one or more other databases available to these entities. Different entities can be authorized to access different items of information or subsets of the total information available relating to each asset, or authorized to create and maintain a database of specific information.

For anti-theft purposes, the shipper enters the manifest of the asset using an input device 521 so that the manifest can be compared to the contents of the asset (at 522). A determination is made at 523 by a processor at the data processing and storage facility 510, or another processor coupled to the terminal associated with the input device 521, as to whether there are any differences between the current contents of the asset and the manifest. For example, the manifest might indicate the presence of contents whereas the information transmitted by the asset reveals that it does not contain any objects. When such a discrepancy is revealed, the shipment can be intercepted at 524 to ascertain the whereabouts of the cargo. The history of the travels of the asset would also be present in the data facility 510 so that it can be readily ascertained where the cargo disappeared. If no discrepancy is revealed, the asset is allowed to proceed at 525. The terminal associated with the manifest input device 521 may also be associated with display or other notification device to notify the party entering the manifest about any discrepancy.

9. Exterior Monitoring Near a Vehicle

Having the ability to transmit coded information to a remote site, using a low cost device having a battery that lasts for many years opens up many other, previously impractical opportunities. Many of these opportunities are discussed above and below and all are teachings of at least one of the inventions disclosed herein. In this section, opportunities related to monitoring the environment in the vicinity of the container will be discussed. Many types of sensors can be used for the purpose of exterior monitoring including ultrasound, imagers such as cameras both with and without illumination including visual, infrared or ultraviolet imagers, radar, scanners including laser radar and phased array radar, other types of sensors which sense other parts of the electromagnetic spectrum, capacitive sensors, electric or magnetic field sensors, and chemical sensors among others.

Cameras either with or without a source of illumination can be used to record people approaching the container and perhaps stealing the contents of the container. At the appropriate frequencies, (tetra Hertz, for example) the presence of concealed weapons can be ascertained as described in *Alien Vision: Exploring the Electromagnetic Spectrum With Imaging Technology* (SPIE Monograph Vol. PM104) by Austin Richards. Infrared sensors can be used to detect the presence of animal life including humans in the vicinity of container. Radio frequency sensors can sense the presence of authorized personnel having a keyless entry type transmitter or a SAW, RFID or similar device of the proper design. In this way, the container can be locked as a safe, for example, and only permit an authorized person carrying the proper identification to open the container or other storage facility.

A pattern recognition system can be trained to identify facial, iris, palm print or other biometric patterns, for example, of authorized personnel or ascertain the identity of authorized personnel to prevent theft of the container. Such a pattern recognition system can operate on the images obtained by the cameras. That is, if the pattern recognition system is a neural network, it would be trained to identify or ascertain the identity of authorized personnel based on images of such personnel during a training phase and thus operationally only allow such personnel to open the container, enter the container and/or handle the container.

A wide variety of smart cards, biometric identification systems (such as fingerprints, voice prints, facial images and Iris scans) can be used for the same purpose. When an unauthorized person approaches the container, his or her picture can be taken and in particular, if sensors determine that someone is attempting to force entry into the container, that person's picture can be relayed via the communication system to the proper authorities. Cameras with a proper pattern recognition system can also be used to identify if an approaching person is wearing a disguise such as a ski mask or is otherwise acting in a suspicious manner. This determination can provide a critical timely warning and in some cases permit an alarm to be sounded or otherwise notify the proper authorities.

Capacitance, optical or magnetic sensors can be used to ascertain that the container is properly attached to a trailer. An RFID or barcode scanner on the container can be used to record the identification of the tractor, trailer, or other element of the transportation system. These are just a small sampling of the additional sensors that can be used with the container or even mounted on a tractor or chassis to monitor the container. With the teachings of at least one of the inventions disclosed herein, the output of any of these sensors can now be transmitted to a remote facility using a variety of telematics methods including communication via a low power link to a satellite, such as provided by the Skybitz Corporation as described above and others.

Thus, as mentioned above, many new opportunities now exist for applying a wide variety of sensors to a cargo container or other object as discussed above and below. Through a communication system such as a cellphone and/or Internet system, critical information about the environment of container or changes in that environment can be transmitted to the container owner, law enforcement authorities, container contents owner etc. Furthermore, the system is generally low cost and does not require connection to an external source of power. The system generally uses low power from a battery that can last for years without maintenance.

10. Analysis

Many of the sensor systems described above output data that can best be analyzed using pattern recognition systems such as neural networks, cellular neural networks, fuzzy logic, sensor fusion, modular neural networks, combination neural networks, support vector machines, neural fuzzy systems or other classifiers that convert the pattern data into an output indicative of the class of the object or event being sensed. One interesting method, for example, is the ZISC® chip system of Silicon Recognition Inc., Petaluna, Calif. A general requirement for the low power monitoring system is that the amount of data routinely sent to the remote site be kept to a minimum. For most transmissions, this information will involve the location of the container, for example, plus a few additional bytes of status information determined by the mission of the particular container and its contents. Thus, the pattern recognition algorithms must convert typically a complex image or other data to a few bytes representative of the class of the monitored item or event.

In some instances, the container must send considerably more data and at a more frequent interval than normal. This will generally happen only during an exceptional situation or event and when the added battery drain of this activity is justified. In this case, the system will signal the satellite that an exception situation exists and to prepare to receive additional information.

Many of the sensors on the container and inside the container may also require significant energy and thus should be used sparingly. For example, if the container is known to be empty and the doors closed, there is no need to monitor the interior of the container unless the doors have been reopened. Similarly, if the container is stationary and doors are closed, then continuously monitoring the interior of the container to determine the presence of cargo is unnecessary. Thus, each of the sensors can have a program duty cycle that depends on exterior or other events. In some applications either solar power or other source of power may be available either intermittently to charge the battery or continuously.

If the vehicle such as a container is stationary then usually the monitoring can take place infrequently and the battery is conserved. When the vehicle is in motion then energy is frequently available to charge the battery and thus more frequent monitoring can take place as the battery is charged. The technique in known as "energy harvesting" and involves, for example, the use of a piezoelectric material that is compressed, bent or otherwise flexed thereby creating an electric current that can be used to charge the battery. Other methods include the use of a magnet and coil where the magnet moves relative to the coil under forces caused by the motion of the vehicle.

Since the duty cycle of the sensor system may vary considerably, and since any of the sensors can fail, be sabotaged or otherwise be rendered incapable of performing its intended function either from time, exposure, or intentionally, it is expected that some or all of the sensors will be equipped with a diagnostic capability. The communication system will generally interrogate each sensor or merely expect a transmission from each sensor and if that interrogation or transmission fails or a diagnostic error occurs, this fact will be communicated to the appropriate facility. If, for example, someone attempts to cover the lens of a camera so that a theft would not be detected, the mere fact that the lens was covered could be reported, alerting authorities that something unusual was occurring.

11. Safety

As mentioned previously, there are times when the value of the contents of a container can exceed the value of the tractor, chassis and container itself. Additionally, there are times when the contents of the container can be easily damaged if subjected to unreasonable vibrations, angles, accelerations and shocks. For these situations, an inertial measurement unit (IMU) can be used in conjunction with the container to monitor the accelerations experienced by the container (or the cargo) and to issue a warning if those accelerations are deemed excessive either in magnitude, duration, or frequency or where the integrations of these accelerations indicate an excessive velocity, angular velocity or angular displacement. Note that for some applications in order to minimize the power expended at the sensor installation, the IMU correction calculations based on the GPS can be done at an off sensor location such as the receiving station of the satellite information.

If the vehicle operates on a road that has previously been accurately mapped, to an accuracy of perhaps a few centimeters, then the analysis system can know the input from the road to the vehicle tires and thus to the chassis of the trailer. The IMU can also calculate the velocity of the trailer. By monitoring the motion of the container when subjected to a known stimulus, the road, the inertial properties of the container and chassis system can be estimated. If these inertial properties are known than a safe operating speed limit can be determined such that the probability of rollover, for example, is kept within reasonable bounds. If the driver exceeds that velocity, then a warning can be issued. Similarly, in some cases, the traction of the trailer wheels on the roadway can be estimated based on the tendency of a trailer to skid sideways. This also can be the basis of issuing a warning to the driver and to notify the contents owner especially if the vehicle is being operated in an unsafe manner for the road or weather conditions. Since the information system can also know the weather conditions in the area where the vehicle is operating, this added information can aid in the safe driving and safe speed limit determination. In some cases, the vibrations caused by a failing tire can also be determined. For those cases where radio frequency tire monitors are present, the container can also monitor the tire pressure and determine when a dangerous situation exists. Finally, the vehicle system can input to the overall system when the road is covered with ice or when it encounters a pothole.

Thus, there are many safety related aspects to having sensors mounted on a container and where those sensors can communicate periodically with a LEO or other satellite, or other communication system, and thereafter to the Internet or directly to the appropriate facility. Some of these rely on an accurate IMU. Although low cost IMUs are generally not very accurate, when they are combined using a Kalman filter with the GPS system, which is on the container as part of the tracking system, the accuracy of the IMU can be greatly improved, approaching that of military grade systems.

12. Other Remote Monitoring

The discussion above has concentrated on containers that contain cargo where presumably this cargo is shipped from one company or organization to another or is stationary. This cargo could be any flowable commodity. What has been described above is a monitoring system for tracking this cargo if it is movable and making measurements to inform the interested parties (owners, law enforcement personnel etc.) of the status of the container, its contents, and the environment. This becomes practical when a cellphone or wireless Internet system coupled with a low cost low power small GPS receiver and communication device capable of sending information periodically to the remote site. Once the remote site has received the position information from the container, for example, this information can be relayed to a computer system wherein the exact location of the container can be ascertained. Additionally, if the container has an RFID reader, the location of all items having an RFID tag that are located within the container can also be ascertained.

The accuracy of this determination is currently now approximately 20 meters. However, the ionosphere caused errors in GPS signals received by container receiver can be determined from a variety of differential GPS systems and that information can be coupled with the information from the container to determine a precise location of the container to perhaps as accurate as a few centimeters. This calculation can be done at any facility that has access to the relevant DGPS corrections and the container location. It need not be done onboard the container. Using accurate digital maps the location of the container on the earth can be extremely precisely determined. This principle can now be used for other location determining purposes. The data processing facility that receives the information from the asset via satellites can also know the DGPS corrections at the asset location and thus can relay to the vehicle its precise location.

Although the discussion above has centered on cargo transportation as an illustrative example, at least one of the inventions disclosed herein is not limited thereto and in fact can be used with any asset whether movable or fixed where monitoring for any of a variety of reasons is desired. These reasons include environmental monitoring, for example, where asset damage can occur if the temperature, humidity, or other atmospheric phenomena exceeds a certain level. Such a device then could transmit to the telecommunications system when this exception situation occurred. It still could transmit to the system periodically, perhaps once a day, just to indicate that all is OK and that an exceptional situation did not occur.

Another example is the monitoring of a vacation home during the months when the home is not occupied. Of course, any home could be so monitored even when the occupants leave the home unattended for a party, for example. The monitoring system can be configured to determine whether the house is on fire, being burglarized, or whether temperature is dropping to the point that pipes could freeze due to a furnace or power failure. Such a system could be less expensive to install and maintain by a homeowner, for example, than systems supplied by ADT, for example. Monitoring of a real estate location could also be applied to industrial, governmental and any other similar sites. Any of the sensors including electromagnetic, cameras, ultrasound, capacitive, chemical, moisture, radiation, biological, temperature, pressure, radiation, etc. can be attached to such a system which would not require any other electrical connection either to a power source or to a communication source such as a telephone line which is currently require by ADT, for example. In fact, most currently installed security and fire systems require both a phone and a power connection. If a power source is available, it can be used to recharge the batteries or as primary power.

Of particular importance, this system and techniques can be applied to general aviation and the marine community for the monitoring of flight and boat routings. For general aviation, this or a similar system can be used for monitoring the unauthorized approach of planes or boats to public utilities, government buildings, bridges or any other structure and thereby warn of possible terrorist activities.

Portable versions of this system can also be used to monitor living objects such as pets, children, animals, cars, and trucks, or any other asset. What is disclosed herein therefore is a truly general asset monitoring system where the type of monitoring is only limited by requirement that the sensors operate under low power and the device does not require connections to a power source, other than the internal battery, or a wired source of communication. The communication link is generally expected to be via a cell phone or the Internet but in some cases an ad hoc peer-to-peer network, IEEE 801.11, Bluetooth, or any other wireless system can be part of the communication system. Thus, using the teachings of at least one of the inventions disclosed herein, any asset can be monitored by any of a large variety of sensors and the information communicated wireless to another location which can be a central station, a peer-to-peer network, a link to the owners location, or, preferably, to the Internet.

Additional areas where the principles of the invention can be used for monitoring other objects include the monitoring of electric fields around wires to know when the wires have failed or been cut, the monitoring of vibrations in train rails to know that a train is coming and to enable tracking of the path of trains, the monitoring of vibrations in a road to know that a vehicle is passing, the monitoring of temperature and/or humidity of a road to signal freezing conditions so that a warning could be posted to passing motorists about the conditions of the road, the monitoring of vibrations or flow in a oil pipe to know if the flow of oil has stopped or being diverted so that a determination may be made if the oil is being stolen, the monitoring of infrared or low power (MIR) radar signal monitoring for perimeter security, the monitoring of animals and/or traffic to warn animals that a vehicle is approaching to eliminate car to animal accidents and the monitoring of material levels in containers or reservoirs. It is also possible to monitor grain levels in storage bins, pressure in containers, chemicals in water or air that could signal a terrorist attack, a pollution spill or the like, carbon monoxide in a garage or tunnel, temperature or vibration of remote equipment as a diagnostic of pending system failure, smoke and fire detectors and radiation. In each case, one or more sensors is provided designed to perform the appropriate, desired sensing, measuring or detecting function and a communications unit is coupled to the sensor(s) to enable transmission of the information obtained by the sensor(s). A processor can be provided to control the sensing function, i.e., to enable only periodic sensing or sensing conditioned on external or internal events. For each of these and many other applications, a signal can be sent to a telematics system to send important information to a need-to-know person, monitoring computer program, the Internet etc.

Three other applications of at least one of the inventions disclosed herein need particular mention. Periodically, a boat or barge impacts with the structure of a bridge resulting in the collapse of a road, railroad or highway and usually multiple fatalities. Usually such an event can be sensed prior to the collapse of the structure by monitoring the accelerations, vibrations, displacement, or stresses in the structural members. When such an event is sensed, a message can be sent to a satellite and/or forwarded to the Internet, and thus to the authorities and to a warning sign or signal that has been placed at a location preceding entry onto the bridge. Alternately, the sensing device can send a signal directly to the relevant sign either in addition or instead of to a satellite.

Sometimes the movement of a potentially hazardous cargo in itself is not significantly unless multiple such movements follow a pattern. For example, the shipment of moderate amounts of explosives forwarded to a single location could signify an attack by terrorists. By comparing the motion of containers of hazardous materials and searching for patterns, perhaps using neural networks, fuzzy logic and the like, such concentrations of hazardous material can be forecasted prior to the occurrence of a disastrous event. This information can be gleaned from the total picture of movements of containers throughout a local, state or national area. Similarly, the movement of fuel oil and fertilizer by itself is usually not noteworthy but in combination using different vehicles can signal a potential terrorist attack.

Many automobile owners subscribe to a telematics service such as OnStar®. The majority of these owners when queried say that they subscribe so that if they have an accident and the airbag deploys, the EMS personnel will be promptly alerted. This is the most commonly desired feature by such owners. A second highly desired feature relates to car theft. If a vehicle is stolen, the telematics services can track that vehicle and inform the authorities as to its whereabouts. A third highly desired feature is a method for calling for assistance in any emergency such as the vehicle becomes stalled, is hijacked, runs off the road into a snow bank or other similar event. The biggest negative feature of the telematics services such as OnStar® is the high monthly cost of the service.

The invention described here can provide the three above-mentioned highly desired services without requiring a high monthly fee. A simple device that communicates to a cell-phone system, Internet or other telematics system can be provided, as described above, that operates either on its own battery and/or by connecting to the cigarette lighter or similar power source. The device can be provided with a microphone and neural network algorithm that has been trained to recognize the noise signature of an airbag deployment or the information that a crash transpired can be obtained from an accelerometer. Thus, if the vehicle is in an accident, the EMS authorities can be immediately notified of the crash along with the precise location of the vehicle. Similarly, if the vehicle is stolen, its exact whereabouts can be determined through an Internet connection, for example. Finally, a discrete button placed in the vehicle can send a panic signal to the authorities via a telematics system. Thus, instead of a high monthly charge, the vehicle owner would only be charged for each individual transmission, which can be as low as $0.20 or less or a small surcharge can be added to the price of the device to cover such costs through averaging over many users. Such a system can be readily retrofitted to existing vehicles providing most of advantages of the OnStar® system, for example, at a very small fraction of its cost. The system can reside in a "sleep" mode for many years until some event wakes it up. In the sleep mode, only a few microamperes of current are drawn and the battery can last the life of the vehicle. A wake-up can be achieved when the airbag fires and the microphone emits a current. Similarly, a piezo-generator can be used to wake up the system based on the movement of a mass or diaphragm displacing a piezoelectric device which then outputs some electrical energy that can be sensed by the system electronics. Similarly, the system can be caused to wake up by a clock or the reception of a proper code from an antenna. Such a generator can also be used to charge the system battery extending its useful life. Such an OnStar®-like system can be manufactured for approximately $100, depending on production volume and features.

The invention described above can be used in any of its forms to monitor materials. For example, sensors can be provided to monitor fuel or oil reservoirs, containers or pipelines and spills. Sensors can be arranged in, on, within, in connection with or proximate a reservoir, container or pipeline and powered in the manner discussed above, and coupled to a communication system as discussed above. When a property of characteristic of the environment is detected by the sensor, for example, detection of a material where none is supposed to be (which could be indicative of a spill), the sensor can trigger a communication system to transmit information about the detection of the material to a remote site which could send response personnel, i.e., clean-up personnel. The sensors can be designed to detect any variables which could provide meaningful information, such as a flow sensor which could detect variations in flow, or a chemical sensor which could detect the presence of a harmful chemical, biological agent or a radiation sensor which could detect the presence of radioactivity. Appropriate action could be taken in response to the detection of chemicals or radioactivity.

Remote water monitoring is also contemplated in the invention since water supplies are potentially subject to sabotage, e.g., by the placement of harmful chemicals or biological agents in the water supply. In this case, sensors would be arranged in, on, within, in connection with or proximate water reservoirs, containers or pipelines and powered in the manner discussed above, and coupled to a communication system as discussed above. Information provided by the sensors is periodically communicated to a remote site at which it is monitored. If a sensor detects the presence of a harmful chemical or agent, appropriate action can be taken to stop the flow of water from the reservoir to municipal systems.

Even the pollution of the ocean and other large bodies of water especially in the vicinity of a shore can now be monitored for oil spills and other occurrences.

Similarly, remote air monitoring is contemplated within the scope of the invention. Sensors are arranged at sites to monitor the air and detect, for example, the presence of radioactivity and bacteria. The sensors can send the information to a communication system which transmits the information to a remote site for monitoring. Detection of aberrations in the information from the sensors can lead to initiation of an appropriate response, e.g., evacuation in the event of radioactivity detection.

The monitoring of forests for fires is also a possibility with the present invention, although satellite imaging systems are a preferred approach.

An additional application is the monitoring of borders such as the on between the United States and Mexico. Sensors can be placed periodically along such a border at least partially in the ground that are sensitive to vibrations, infrared radiation, sound or other disturbances. Such sensor systems can also contain a pattern recognition system that is trained to recognize characteristic signals indicating the passing of a person or vehicle. When such a disturbance occurs, the system can "wake-up" and receive and analyze the signal and if it is recognized, a transmission to a communication system can occur. Since the transmission would also contain either a location or an identification number of the device, the authorities would know where the border infraction was occurring.

Above, the discussion of the invention has included the use of a location determining signal such as from a GPS or other location determining system such as the use of time of arrival calculations from receptions from a plurality of cell phone antennas. If the device is located in a fixed place where it is unlikely to move, then the location of that place need only be determined once when the sensor system is put in place. The identification number of the device can then be associated with the device location in a database, for example. Thereafter, just the transmission of the device ID can be used to positively identify the device as well as its location. Even for movable cargo containers, for example, if the container has not moved since the last transmission, there is no need to expend energy receiving and processing the GPS or other location determining signals. If the device merely responds with its identification number, the receiving facility knows its location. The GPS processing circuitry can be reactivated if sensors on the asset determine that the asset has moved.

Once the remote site via a cellphone, Internet or other communication system has received a message from the sensor system of at least one of the inventions disclosed herein, it can either store the information into a database or, more commonly, it can retransmit or make available the data usually on the Internet where subscribers can retrieve the data and use it for their own purposes. Since such sensor systems are novel to at least one of the inventions disclosed herein, the transmission of the data via the Internet and the business model of providing such data to subscribing customers either on an as-needed bases or on a push basis where the customer receives an alert is also novel. Thus, for example, a customer may receive an urgent automatically-generated e-mail message or even a pop-up message on a particular screen that there is a problem with a particular asset that needs immediate attention. The customer can be a subscriber, a law enforcement facility, or an emergency services facility, among others.

An additional dimension exists with the use this system where the asset mounted communications device has further wireless communications with other devices in or on the asset. The fact that certain tagged items within or on the assets can be verified if a local area network exists between the communications device and other objects. Perhaps it is desired to check that a particular piece of test equipment is located within an asset. Further perhaps it is desired to determine that the piece of equipment is operating or operating within certain parameter ranges, or has a particular temperature etc. Perhaps it is desired to determine whether a particular set of keys are in a key box wherein the keys are fitted with an RFID tag and the box with a reader and method of communicating with the communications device. The possibilities are endless for determining the presence or operating parameters of a component of occupying item of a remote asset and to periodically communicate this information to an internet site, for example, using a low power asset monitoring system such as described herein.

Although several preferred embodiments are illustrated and described above, there are possible combinations using other signals and sensors for the components and different forms of the neural network implementation or different pattern recognition technologies that perform the same functions which can be utilized in accordance with the invention. Also, although the neural network and modular neural networks have been described as an example of one means of pattern recognition, other pattern recognition means exist and still others are being developed which can be used to identify potential component failures by comparing the operation of a component over time with patterns characteristic of normal and abnormal component operation. In addition, with the pattern recognition system described above, the input data to the system may be data which has been pre-processed rather than the raw signal data either through a process called "feature extraction" or by various mathematical transformations. Also, any of the apparatus and methods disclosed herein may be used for diagnosing the state of operation or a plurality of discrete components.

Finally, the above-described structure provides new and improved techniques for monitoring interior spaces in movable or fixed structures which are capable of holding or storing flowable materials such as vehicles, collection containers and in particular storage containers or containers and in determining the quantity, amount or level thereof.

There are also possible combinations using other geometries, sensors, materials and different dimensions for the components that perform the same functions. At least one of the inventions disclosed herein is not limited to the above embodiments and should be determined by the following claims. There are also numerous additional applications in addition to those described above. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention which is limited only by the following claims.

The invention claimed is:

1. A material storage container including an arrangement for monitoring the container, comprising:
    a housing defining an interior receivable of a removable flowable material, the level or quantity of the material in the interior of the housing being variable during use of the container while the container is fixed or moving on land;
    an interior sensor system arranged on or in said housing, said interior sensor system being configured to obtain information about a current level or quantity of material in the interior of said housing;
    a location determining system arranged on or in said housing, said location determining system being configured to determine its location which is considered the same as a location of the container;
    a communication system coupled to said interior sensor system and said location determining system, said communication system being arranged on or in said housing, said communication system being configured to transmit the obtained information about the material in the interior of said housing and the determined location of the container to a remote facility separate and apart from the container such that the transmission of the obtained information about the material in the interior of said housing and the determined location of the container originates from the housing; and a wakeup sensor system that detects occurrence of an internal or external requiring a change in the frequency of monitoring of the interior of said housing by said interior sensor system, said interior sensor system being coupled to said wakeup sensor system and configured to change a rate at which it obtains information about the material in the interior of said housing in response to the detected occurrence of an internal or external event by said wakeup sensor system, whereby the rate at which said interior sensor system obtains information about the material in the interior of said housing before the detected occurrence of the internal or external event by said wakeup sensor system is different than the rate at which said interior sensor system obtains information about the material in the interior of said housing after the detected occurrence of the internal or external event by said wakeup sensor system.

2. The container of claim 1, wherein said interior sensor system comprises at least one transmitter/receiver configured to direct waves at an upper surface of the material when present in the interior of said housing, further comprising a processor configured to analyze waves received by said at least one transmitter/receiver and derive information about a quantity of the material in the interior of said housing based on the analysis of the waves received by said at least one transmitter/receiver.

3. The container of claim 1, wherein said interior sensor system comprises at least one ultrasonic wave transmitter/receiver that directs ultrasonic waves at an upper surface of the material when present in the interior of said housing and receives ultrasonic waves reflected from the upper surface of the material, further comprising a processor coupled to said at least one transmitter/receiver and that is configured to analyze waves received by said at least one transmitter/receiver and derive information about a quantity of the material in the interior of said housing based on the analysis of the waves received by said at least one transmitter/receiver, said processor being further configured to obtain information about gas in the interior of said housing and compensate for gas density gradients in the interior of said housing when deriving the information about the quantity of the material in the interior of said housing.

4. The container of claim 1, wherein said interior sensor system comprises at least one sensor arranged on a roof or lid of said container and configured to direct waves downward from said roof or lid.

5. The container of claim 1, wherein said interior sensor system comprises at least one sensor that obtains information about a quantity of the material in the interior of said housing and a processor coupled to said at least one sensor and that periodically directs said at least one sensor to obtain information.

6. The container of claim 1, wherein said wakeup sensor system detects absence of an event requiring a change in the frequency of monitoring of the interior of said housing by said interior sensor system for a set time period, said interior sensor system being coupled to said wakeup sensor system and configured to change a rate at which it obtains information about the material in the interior of said housing in response to the detected absence of an event for the set time period by said wakeup sensor system, whereby the rate at which said interior sensor system obtains information about the material in the interior of said housing before the detected absence of an event for the set time period by said wakeup sensor system is different than the rate at which said interior sensor system obtains information about the material in the interior of said housing after the detected absence of an event for the set time period by said wakeup sensor system.

7. The container of claim 1, wherein said interior sensor system further comprises at least one chemical sensor for monitoring the chemical nature of the material in the interior of said housing such that the information about the material includes information about the chemical nature of the material.

8. The container of claim 1, wherein said interior sensor system comprises at least one optical sensor configured to obtain images of the interior of said housing and extract from said images information about the material in said housing.

9. The container of claim 1, further comprising a motion or vibration detection system configured to detect motion or vibration of the container, said interior sensor system being coupled to said motion or vibration detection system and being configured to obtain information about the material of the interior of said housing after the container is determined to have moved from a stationary position or vibrated by said motion or vibration detection system.

10. The container of claim 1, wherein said communication system utilizes cellphone or Internet communications.

11. The container of claim 1, wherein said interior sensor system is provided with a predetermined set of conditions and is configured to analyze whether the obtained information satisfies one of the predetermined set of conditions, and when the obtained information satisfies one of the predetermined set of conditions, said communication system is configured to transmit the obtained information and the determined location of the container to the remote facility.

12. A system for monitoring containers, comprising:
a plurality of containers according to claim 1; and
a remote site separate and apart from said plurality of containers and at which the remote facility is situated, said remote site including a communication system that communicates with said communication systems on all of said plurality of containers,
said remote site further including a data processing and storage unit that, upon demand, prepares reports about one or more selected ones of said plurality of containers and enables access to the prepared reports.

13. A method for monitoring at least one material storage container, comprising:
obtaining information about a current level or quantity of material in an interior of a housing defining each of the at least one container receivable of a removable flowable material using an interior sensor system arranged on or in the housing, the level or quantity of the material in the interior of the housing being variable during use of the container while the container is fixed or moving on land;
determining a location of each of the at least one container using a location determining system arranged on or in the housing;
transmitting the obtained information about the material in the interior of the housing and the determined location of the container to a remote facility separate and apart from the at least one container using a communication system coupled to the interior sensor system and the location determining system such that the transmission of the obtained information about the material in the interior of the housing and the determined location of the container originates from the housing; and detecting motion or vibration of the container and limiting the information obtaining step to a period of time after motion or vibration has been detected.

14. The method of claim 13, further comprising:
determining gas density at multiple, spaced-apart locations in the container; and
compensating, using a processor, for gas density gradients in the interior of the housing based on the obtained information when obtaining the information about the quantity of the material in the interior of the housing.

15. The method of claim 13, further comprising:
detecting a change in the housing related to a change in the level or quantity of material in the interior of the housing;
obtaining additional information about the level or quantity of material in the interior of the housing using the interior sensor system after the detected change in the housing; and
transmitting the obtained additional information and the determined location of the container to the remote facility using the communication system.

16. The method of claim 13, wherein the at least one container comprises a plurality of containers at different locations.

17. The method of claim 16, further comprising forming a database of information provided by the plurality of containers.

18. The method of claim 17, further comprising enabling access to the database from terminals to enable reports about identified containers to be provided to the terminals.

19. A material storage container including an arrangement for monitoring the container, comprising:
a housing defining an interior receivable of a removable flowable material, the level or quantity of the material in the interior of the housing being variable during use of the container;
an interior sensor system arranged on or in said housing, said interior sensor system being configured to obtain information about a current level or quantity of material in the interior of said housing;
a location or identification determining system at least partially arranged on said housing, said location or identification determining system being configured to at least partially determine its location which is considered the same as a location of the container or provide an indicia enabling location of the container to be determined;
a communication system coupled to said interior sensor system and said location determining system, said communication system being configured to transmit the obtained information about the material in the interior of said housing and the determined location or indicia of the container to a remote facility separate and apart from the container; and
a wakeup sensor system that detects occurrence of an internal or external requiring a change in the frequency of monitoring of the interior of said housing by said interior sensor system,
said interior sensor system being coupled to said wakeup sensor system and configured to change a rate at which it obtains information about the material in the interior of said housing in response to the detected occurrence of an internal or external event by said wakeup sensor system,
whereby the rate at which said interior sensor system obtains information about the material in the interior of said housing before the detected occurrence of the internal or external event by said wakeup sensor system is different than the rate at which said interior sensor system obtains information about the material in the interior of said housing after the detected occurrence of the internal or external event by said wakeup sensor system.

20. A material storage container including an arrangement for monitoring the container, comprising:
a housing defining an interior receivable of a removable flowable material, the level or quantity of the material in the interior of the housing being variable during use of the container;
an interior sensor system arranged on or in said housing, said interior sensor system being configured to obtain information about a current level or quantity of material in the interior of said housing;
a location or identification determining system at least partially arranged on said housing, said location or identification determining system being configured to at least partially determine its location which is considered the same as a location of the container or provide an indicia enabling location of the container to be determined;
a communication system coupled to said interior sensor system and said location determining system, said communication system being configured to transmit the obtained information about the material in the interior of said housing and the determined location or indicia of the container to a remote facility separate and apart from the container; and
a wakeup sensor system that detects absence of an event requiring a change in the frequency of monitoring of the interior of said housing by said interior sensor system for a set time period,
said interior sensor system being coupled to said wakeup sensor system and configured to change a rate at which it obtains information about the material in the interior of said housing in response to the detected absence of an event for the set time period by said wakeup sensor system,
whereby the rate at which said interior sensor system obtains information about the material in the interior of said housing before the detected absence of an event for the set time period by said wakeup sensor system is different than the rate at which said interior sensor system obtains information about the material in the interior of said housing after the detected absence of an event for the set time period by said wakeup sensor system.

21. A material storage container including an arrangement for monitoring the container, comprising:
a housing defining an interior receivable of a removable flowable material, the level or quantity of the material in the interior of the housing being variable during use of the container;
an interior sensor system arranged on or in said housing, said interior sensor system being configured to obtain information about a current level or quantity of material in the interior of said housing;
a location or identification determining system at least partially arranged on said housing, said location or identification determining system being configured to at least partially determine its location which is considered the same as a location of the container or provide an indicia enabling location of the container to be determined;

a communication system coupled to said interior sensor system and said location determining system, said communication system being configured to transmit the obtained information about the material in the interior of said housing and the determined location or indicia of the container to a remote facility separate and apart from the container; and a motion or vibration detection system arranged to detect motion or vibration of the container, said interior sensor system being coupled to said motion or vibration detection system and being configured to obtain information about the material of the interior of said housing only after the container is determined to have moved from a stationary position or vibrated by said motion or vibration detection system.

22. A material storage container including an arrangement for monitoring the container, comprising:

a housing defining an interior receivable of a removable flowable material, the level or quantity of the material in the interior of the housing being variable during use of the container;

an interior sensor system arranged on or in said housing, said interior sensor system being configured to obtain information about a current level or quantity of material in the interior of said housing;

a location or identification determining system at least partially arranged on said housing, said location or identification determining system being configured to at least partially determine its location which is considered the same as a location of the container or provide an indicia enabling location of the container to be determined; and a communication system coupled to said interior sensor system and said location determining system, said communication system being configured to transmit the obtained information about the material in the interior of said housing and the determined location or indicia of the container to a remote facility separate and apart from the container;

said interior sensor system being provided with a predetermined set of conditions and configured to analyze whether the obtained information satisfies one of the predetermined set of conditions, and when the obtained information satisfies one of the predetermined set of conditions, said communication system is configured to transmit the obtained information and the determined location of the container to the remote facility.

23. A method for monitoring at least one material storage container, comprising:

obtaining information about a current level or quantity of material in an interior of a housing defining each of the at least one container receivable of a removable flowable material using an interior sensor system arranged on or in the housing, the level or quantity of the material in the interior of the housing being variable during use of the container;

determining a location of each of the at least one container or providing an indicia enabling location of that container to be determined using a location or identification determining system arranged on or in the housing;

transmitting the obtained information about the material in the interior of the housing and the determined location or indicia of the container to a remote facility separate and apart from the container using a communication system coupled to the interior sensor system and the location determining system; and detecting motion or vibration of the container and limiting the information obtaining step to a period of time after motion or vibration has been detected.

* * * * *